(12) United States Patent
Phua et al.

(10) Patent No.: US 12,478,308 B2
(45) Date of Patent: Nov. 25, 2025

(54) IDENTIFYING AND EXTRACTING ELECTROENCEPHALOGRAM SIGNALS

(71) Applicants: AGENCY FOR SCIENCE, TECHNOLOGY AND RESEARCH, Singapore (SG); TAN TOCK SENG HOSPITAL PTE LTD, Singapore (SG)

(72) Inventors: Kok Soon Phua, Singapore (SG); Hai Hong Zhang, Singapore (SG); Su-Yin Yang, Singapore (SG); Fong Ling Loy, Singapore (SG); Ka Yin Christina Tang, Singapore (SG); Soon Huat Ng, Singapore (SG); Chuan Chu Wang, Singapore (SG); Cuntai Guan, Singapore (SG); Soon Yin Tjan, Singapore (SG)

(73) Assignees: AGENCY FOR SCIENCE, TECHNOLOGY AND RESEARCH, Singapore (SG); TAN TOCK SENG HOSPITAL PTE LTD, Singapore (SG)

(*) Notice: Subject to any disclaimer, the term of this patent is extended or adjusted under 35 U.S.C. 154(b) by 1052 days.

(21) Appl. No.: 17/598,139

(22) PCT Filed: Mar. 29, 2019

(86) PCT No.: PCT/SG2019/050184
§ 371 (c)(1),
(2) Date: Sep. 24, 2021

(87) PCT Pub. No.: WO2020/204810
PCT Pub. Date: Oct. 8, 2020

(65) Prior Publication Data
US 2022/0183611 A1 Jun. 16, 2022

(51) Int. Cl.
*A61B 5/372* (2021.01)
*A61B 5/00* (2006.01)
*G16H 50/30* (2018.01)

(52) U.S. Cl.
CPC .......... *A61B 5/372* (2021.01); *A61B 5/4824* (2013.01); *A61B 5/7267* (2013.01); *G16H 50/30* (2018.01)

(58) Field of Classification Search
CPC ..... A61B 5/372; A61B 5/4824; A61B 5/7267; A61B 5/369; G16H 50/30; G06N 3/08; G06N 20/10
See application file for complete search history.

(56) References Cited

U.S. PATENT DOCUMENTS

2008/0249430 A1 10/2008 John
2014/0187973 A1* 7/2014 Brown .................... G06F 17/18
600/483

(Continued)

FOREIGN PATENT DOCUMENTS

CN 106974621 A 7/2017
IN 201721038783 A 12/2017

OTHER PUBLICATIONS

International Search Report mailed Jun. 18, 2019 for International Patent Application No. PCT/SG2019/050184.

(Continued)

*Primary Examiner* — Tse W Chen
*Assistant Examiner* — Evelyn Grace Park
(74) *Attorney, Agent, or Firm* — Volpe Koenig

(57) ABSTRACT

Disclosed is a process for identifying and extracting pain-related electroencephalogram (EEG) signals. The process comprises receiving, from one or more trials, EEG data for each trial; determining a current density for each signal; estimating the current density for a set of neural activity (Continued)

regions of interest, based on the computed current density; and computing at least one spectrum characteristic for each trial based on the estimated current density. Thus mean and variance of changes in the EEG data between EEG data labeled as being indicative of a pain state and EEG data labeled as being indicative of a non-pain state, for each neural activity region of interest can be calculated, and pain-related EEG signals can be identified based on at least one a region of interest at which the variance is below a predetermined threshold.

20 Claims, 16 Drawing Sheets

(56) References Cited

U.S. PATENT DOCUMENTS

| | | | |
|---|---|---|---|
| 2015/0012111 A1* | 1/2015 | Contreras-Vidal | A61B 5/369 |
| | | | 623/25 |
| 2016/0213276 A1* | 7/2016 | Gadot | G16Z 99/00 |
| 2017/0311882 A1 | 11/2017 | Saab | |

OTHER PUBLICATIONS

Written Opinion mailed Jun. 18, 2019 for International Patent Application No. PCT/SG2019/050184.

Nezam, T., et al. A Novel Classification Strategy to Distinguish Five Levels of Pain Using the EEG Signal Features. IEEE Transactions on Affective Computing, Jun. 28, 2018, pp. 1-8. [Retrieved on Jun. 18, 2019] <DOI: 10.1109/TAFFC.2018.2851236>.

Vatankhah, M., et al. Pain Level Measurement Using Discrete Wavelet Transform. International Journal of Engineering and Technology. Oct. 31, 2016. Vol. 8, No. 5, pp. 380-384. [Retrieved on Jun. 18, 2019]<DOI: 10.7763/IJET.2016.V8.917>.

* cited by examiner

1

IDENTIFYING AND EXTRACTING ELECTROENCEPHALOGRAM SIGNALS

CROSS REFERENCE TO RELATED APPLICATION

This application is a national stage entry of International Patent Application No. PCT/SG2019/050184 filed on Mar. 29, 2019, which application is incorporated by reference herein as fully set forth.

TECHNICAL FIELD

The present invention relates, in general terms, to a process of identifying electroencephalogram (EEG) patterns that are associated with pain. The present invention also relates to an interactive process for pain experience alleviation training.

BACKGROUND

Chronic pain, defined as persistent pain lasting more than three months, is a very complex process that not only has effects on the central nervous system but may even arise from central nervous system dysfunction. The World Health Organization in 1986, declared that pain still affects many people worldwide. Moreover, chronic pain continues to be a common problem in Singapore, with an estimated 1 in every 10 people effected.

GSK Global Pain Index 2017 reported that pain affects workplace productivity and also impacts quality of life. The cost to the global economy is estimated at more than $245 billion US dollars annually.

Because of the complexity of the pathophysiological mechanisms of chronic pain, there are several existing treatment options, namely medications, minimally invasive interventional procedures, and open surgery. That said, the most common pain treatment options are primarily drug-based treatments that include the use of opioids, anticonvulsants, and anti-inflammatory agents. Such treatments are costly and have a relatively low success rate. More importantly, these options share the shortcomings of potentially serious adverse side effects, complications and can cause dependency in the users.

In short, the two most prominent problems facing management of chronic pain is the lack of an objective way to detect pain and also the lack of inexpensive, non-invasive and safe methods to treat the central nervous system in the handling of pain.

It is desirable, therefore, to provide a solution to one or more of the abovementioned drawbacks, such as those relating to existing pain treatment methods, or to at least provide a useful alternative.

SUMMARY OF THE INVENTION

The present invention was developed in view of the healthcare burden of managing chronic pain and the negative impact of chronic pain imposed on the individual (physically, emotionally and economically), others and society, and the challenges in rehabilitating pain-related fear-avoidance behaviours. Embodiments of the brain-computer interface (BCI) described herein have the potential to identify unique pain-specific EEG patterns matched to pain specific conditions and displays of fear-avoidance behaviours. Those BCIs may also be used as a treatment tool in the modulation of pain. If positive patterns of pain management are maintained over time, this may significantly impact the way pain is rehabilitated in healthcare. Specifically, this may allow tailoring of treatment to pain specific conditions and contribute to a better understanding and treatment of fear-avoidance behaviours. Moreover, if the benefits of BCI training are sustained, there is also potential in reducing healthcare costs in the long-term. Thus, disclosed are BCI-based pain detection and/or alleviation systems.

In a first aspect, the present invention provides a process for identifying and extracting pain-related electroencephalogram (EEG) signals, comprising:

receiving, from one or more trials, EEG data for each trial, the EEG data comprising one or more signals each associated with a respective coordinate vector, the EEG data being labeled as being indicative of a pain state and/or a non-pain state;

determining the current density for each of the one or more signals, in the respective coordinate vector;

estimating the current density for a set of neural activity regions of interest, based on the computed current density;

computing at least one spectrum characteristic for each trial based on the estimated current density;

computing, based on the at least one spectrum characteristic a mean and variance of changes in the EEG data between EEG data labeled as being indicative of a pain state and EEG data labeled as being indicative of a non-pain state, for each neural activity region of interest; and identifying pain-related EEG signals based on at least one said region of interest at which the variance is below a predetermined threshold.

The method may further comprise extracting pain-related EEG signals from the region of interest or regions of interest.

The method may therefore search for an optimum collection of cortex locations/EEG coordinate on the scalp/regions of interest where the current density activities, estimated from the electrical potentials of EEG, shows the most consistent changes from non-pain EEG to pain EEG.

The method may further comprise constructing a classification machine to predict if an EEG recording is associated with pain or non-pain. The method may further comprise constructing a regression machine to predict if an EEG recording is associated with the perceived pain level. The machine may employ and algorithm that uses the current density activity measurement for each EEG recording. Constructing a classification/regression machine may involve constructing a machine that uses one of a support vector machine, deep neural network, etc., or combinations thereof—whereas linear mechanisms are preferred. The output of the classification/regression machine is a scalar indicator (a scalar instead of binary output value can usually be computed from a binary classification machine), the method further comprising using the scalar indicator to indicate the level of pain-EEG activation—i.e. which class of the at least two pain-related EEG classes to which the EEG belongs.

Computing a mean and variance of changes in EEG data may involve computing at least one of a between-class scatter matrix and a total scatter matrix, based on the spectrum characteristic, to determine a co-variance between at least two pain-related EEG classes.

The step of receiving EEG data may involve receiving EEG data for which a movement threshold has not been exceeded—e.g. motion artefact from EEG. The movement threshold may be set at a level at which movement artefacts on recorded EEG are not significant enough to reduce accuracy of the method described above. Exceeding the movement threshold may be determined by a movement sensor attached to a subject from whom the EEG data was captured, or by the subject of their clinician positively labeling the EEG data in the event of movement—e.g. by button press. Motion artefacts may also be reduced or removed by having the subject sit, stand or lie still during the trials, or by pre-processing the EEG to remove motion artefacts.

The pain-related EEG classes may simply be a pain EEG class—indicating that the subject was in pain at the time the EEG was recorded—and a pain-free EEG class—indicating that the subject was not in pain at the time the EEG was recorded. In some instances, there may be more than two classes representing different degrees of pain. Thus, the at least two pain-related EEG classes are a pain EEG class and a pain-free EEG class.

The current density may be radial current density.

Calculating a mean and variance of changes in the EEG data may comprise computing at least one of a between-class scatter matrix and a total scatter matrix. Both the between-class scatter matrix and the total scatter matrix may be computed and identifying EEG signals may comprise satisfying the equation:

$$\mathrm{argmin}_L f(L)$$

where f(L) is the multi-variate Fisher's score for neural activity region of interest L, where f(L) is:

$$f(L) = \mathrm{trace}\ \{S_b(S_t + \gamma_I)^{-1}\}$$

where $S_b$ is the between-class scatter matrix, $S_t$ is the total scatter matrix, $\gamma$ is a positive regularisation parameter, and I is a unit matrix.

The regions of interest may be cortex locations/EEG coordinate on the scalp.

The at least two pain-related EEG classes may be a pain EEG class and a pain-free EEG class.

The method may further comprise:
building a binary classification machine for receiving current density or current density activity from further EEG data and outputting a scalar indicator;
receiving further EEG data;
applying the binary classification machine to the further EEG data; and classifying the further EEG data as being indicative of a pain state or non-pain state based on the scalar indicator associated with the further EEG data.

In an embodiment, the process is for identifying and extracting pain-related electroencephalogram (EEG) signals and thus building a classification machine, comprising:
(pain-EEG data collection) Attaching a EEG device to a chronic pain patient and, when a pain attack event occurs, the patient/operator shall register the event into the EEG data stream being recorded digitally; if the pain sensation significantly reduces after sometime, he/she shall register this reduced pain event into the EEG data stream; the patient's perceived pain score can also be registered; repeating the process to record more of such pain events.
putting the person into still position (e.g. sitting, standing, lying down etc), and if there is no pain sensation, recording the non-pain EEG data for a period of time.
collecting non-pain and pain EEG recordings from other chronic pain patients following the same protocol.
using a computer to process the recorded data to identify brain activation patterns in EEG in relation to pain; in principle, the computer algorithm, described in details in the technical report, uses an iterative optimisation process to search for an optimum collection of cortex locations/EEG coordinate on the scalp where the current density activities, estimated from the electrical potentials of EEG, shows the most consistent changes from non-pain EEG to pain EEG, where
the current density activities may refer to specific spectrum characteristics such as band-powers, of the current density that naturally varies over time;
the consistency of the changes from non-pain EEG to pain EEG, can be measured using statistics such as Fisher's discriminant or Kullback-Leibler divergences;
the current density can be estimated using spherical spline interpolation of surface potentials (EEG) such as the method proposed in Perrin et al. (1989);
using the computer to construct a classification/regression algorithm to predict if an EEG recording is associated with pain or non-pain (in case of classification), or with the perceived pain level (in case of regression, provided the patient's perceived pain level is registered as mentioned above); the algorithm uses the abovementioned current density activity measurement for each EEG recording; and the classifier mechanism may use any methods such as support vector machine, deep neural networks, etc., or their combinations, whereas linear mechanisms are preferred; the algorithm's output, as a scalar indicator (a scalar instead of binary output value can usually be computed from a binary classification machine), is then used to indicate the level of pain-EEG activation.

Also disclosed herein is a computer process for quantifying the activation of the pain-related EEG signal activity, comprising:
performing a computer process as described above on the EEG data so as to compute the current density activity measurement identified above, using the classification/regression algorithm to compute the level of pain-related EEG activity.

The computer process may further comprise receiving an initial input comprising a numerical pain level assessment, and wherein receiving further EEG data comprises receiving successive EEG epochs from continuously acquired EEG data, the computer process further comprising re-assessing the numerical pain level based on the abovementioned quantification of activation level of the pain-related EEG signal in each successive EEG epoch.

The above computer processes, or methods, provide a novel adaptive and participant-specific pain neuromatrix detection and analysis program that explore and identify discriminative and robust patterns in spontaneous EEG for pain modeling and decoding.

Also disclosed herein is a computer process for quantifying the activation of the pain-related EEG signal activity, comprising:
performing a computer process as described above on the EEG data so as to compute the current density activity measurement identified above,
using the classification/regression algorithm to compute the level of pain-related EEG activity;
classifying the further EEG data using the binary classification machine, to determine if the further EEG data is representative of a pain EEG class or a pain-free EEG class.

Also disclosed herein is a computer process for classifying pain-related EEG signals, comprising:

collecting EEG data from a plurality of trials, the plurality of trials comprising:
  at least one trial performed by a first subject susceptible to experience pain; and
  at least one trial performed by a second, healthy subject, wherein the EEG data for each trial comprises one or more signals;
performing a computer process as described above on the EEG data, and setting an initial coordinate vector for each signal; and
building a binary classification machine to discriminate between the at least two pain-related EEG states, based on EEG measurements from the at least one region of interest;
receiving further EEG data; and
applying the binary classification machine to the further EEG data;
receiving a scalar indicator from the binary classification machine and classifying, based on the scalar indicator, the further EEG data as being representative of either a pain EEG class or a pain-free EEG class.

The binary classification machine may be at least one of:
a support vector machine;
a multi-layer neural network; and
a generalised linear discriminant analyser.

Computing the mean and variance may comprise computing at least one of a between-class scatter matrix and a total scatter matrix, based on the at least one spectrum characteristic, to determine a co-variance between at least two pain-related EEG classes. Computing the between-class scatter matrix and the total scatter matrix may comprise:
  generating spline interpolation matrices for at least two electrical properties of the EEG data;
  transforming the EEG data into a current density estimate using the spline interpolation matrices;
  computing band-powers for the current density estimate; and
  calculating the between-class scatter matrix and the total scatter matrix using band-powers for the current density estimate.

Computing band-powers for the current density estimate may comprise:
  determining a current density time series for the current density estimate;
  computing a vector of band-powers for the current density time series using at least one of Fourier-based decomposition and band-pass filtering followed by energy computation.

Classifying the further EEG sample using the binary classification machine may comprise:
  transforming the further EEG data into a further current density estimate using the spline interpolation matrices;
  computing band-powers for the further current density estimate; and
  applying the binary classification machine to the band-powers, wherein a positive output of the binary classification machine is indicative of a first state of a pain EEG state and a pain-free EEG state of a source of the further EEG data, and wherein a negative output of the binary classification machine is indicative of a second state of a pain EEG state and a pain-free EEG state of the source that is different from the first state.

The computer process may further comprise receiving an initial input comprising a numerical pain level assessment, and receiving further EEG data may comprise receiving successive EEG epochs from continuously recorded (i.e. acquired) EEG data, the computer process potentially further comprising re-assessing (e.g. incrementing or decrementing) the numerical pain level assessment based on each successive EEG epoch is classified as being representative of a pain EEG class or a pain-free EEG class—e.g. whether the abovementioned quantification of activation level of the pain-related EEG signal in each successive EEG epoch.

The above computer processes, or methods, provide a novel adaptive and participant-specific pain neuromatrix detection and analysis program that explore and identify discriminative and robust patterns in spontaneous EEG for pain modeling and decoding.

Also disclosed herein is a system (e.g. a portable electronic device such as a smartphone) for identifying and extracting pain-related EEG signals, comprising:
an EEG signal source;
memory; and
at least one processor, the memory storing instructions that, when executed by the at least one processor, cause the at least one processor to:
  receive, from one or more trials, EEG data for each trial, the EEG data comprising one or more signals each associated with a respective coordinate vector, the EEG data being labeled as being indicative of a pain state and/or a non-pain state;
  determine a current density for each of the one or more signals, in the respective coordinate vector;
  estimate the current density for a set of neural activity regions of interest, based on the computed current density;
  compute at least one spectrum characteristic for each trial based on the estimated current density;
  compute, based on the at least one spectrum characteristic, a mean and variance of changes in the EEG data between EEG data labeled as being indicative of a pain state and EEG data labeled as being indicative of a non-pain state, for each neural activity region of interest; and
  identify pain-related EEG signals based on the region of interest, or regions of interest, at which the variance is below a predetermined threshold.

In some embodiments, the EEG signal source may be a memory device or wire storing the EEG data. In other embodiments, the EEG signal source may be a subject from which the EEG signal is being directly recorded.

The electrical potential field characteristic may be radial current density.

The at least one processor may compute both the between-class scatter matrix and the total scatter matrix, and may identify the pain-related EEG signals by satisfying the equation:

$$\arg\min_L f(L)$$

where $f(L)$ is the multi-variate Fisher score for neural activity region of interest $L$, where $f(L)$ is:

$$f(L) = \text{trace}\{S_b(S_t + \gamma_I)^{-1}\}$$

where $S_b$ is the between-class scatter matrix, $S_t$ is the total scatter matrix, $\gamma$ is a positive regularisation parameter, and $I$ is the identity matrix.

The EEG signal source may be arranged to collect EEG data from a plurality of trials, the plurality of trials comprising:
  at least one trial performed by a first subject susceptible to experience pain; and
  at least one trial performed by a second, healthy subject, wherein the EEG data for each trial comprises one or more signals;

wherein the at least one processor is configured to:
apply an initial coordinate vector for each said signal;
build a binary classification machine to discriminate between the at least two pain-related EEG states, based on EEG measurements from the at least one region of interest for extracting pain-related EEG signals;
receive further EEG data; and
classify the further EEG data using the binary classification machine to output a scalar indicator, and determining, from the scalar indicator, if the further EEG data is representative of a pain EEG class or a pain-free EEG class.

The system may further comprise an input device for receiving an initial input comprising a numerical pain level assessment, and wherein the at least one processor is configured to:
receive further EEG data by receiving successive EEG epochs from continuously recorded EEG data; and
increment or decrement the numerical pain level assessment based on whether each successive EEG epoch is classified as being representative of a pain EEG class or a pain-free EEG class.

The system may further comprise:
a display;
an input device; and
one or more EEG devices for each region of interest of the at least one region of interest, and positioned at the respective region of interest, for recording the continuously recorded EEG data from which the successive EEG epochs are received,
wherein the at least one processor is further configured to:
determine an attention score for a first EEG epoch from the successive EEG epochs;
display, on the display:
the numerical pain level assessment;
the attention score; and
an interactive activity;
continually update the numerical pain level assessment and attention score, during interaction with the interactive activity via the input device, based on subsequent EEG epochs from the successive EEG epochs; and
adapt a behaviour of the interactive activity to reduce a number of subsequent EEG epochs that are classified as pain EEG class.

The one or more EEG devices may be adapted to apply simulation at one or more of the at least one region of interest, and wherein recording the continuously recorded EEG using the one or more EEG devices comprises recording EEG resulting from stimulation applied by the one or more EEG devices at the at least one region of interest.

The above systems may provide a novel brain computer interface (BCI) pain alleviation system. The system may be based on, or operate on, pain nociception detection and cognitive function computing with interactive audio-visual feedbacks for the modulation of pain, or with other neurostimulation mechanisms (such as vagus nerve stimulation).

Some embodiments of the system may identify a pain signature by correlating the electroencephalogram (EEG) signal to pain episodes from a cohort of healthy participants and chronic pain patients. The system can then develop a training and processing mechanism, or sequence, designed for pain neuromatrix modeling and decoding. Thereafter, a closed-loop sensing and neural feedback mechanism is established, for pain neuromodulatory therapy using joint attention and pain neuromatrix activity monitoring and stimulation to help chronic pain patients.

BRIEF DESCRIPTION OF THE DRAWINGS

Embodiments of the present invention will now be described, by way of non-limiting example, by reference to the drawings, in which:

FIG. 5, comprising

DETAILED DESCRIPTION

Figure 1:
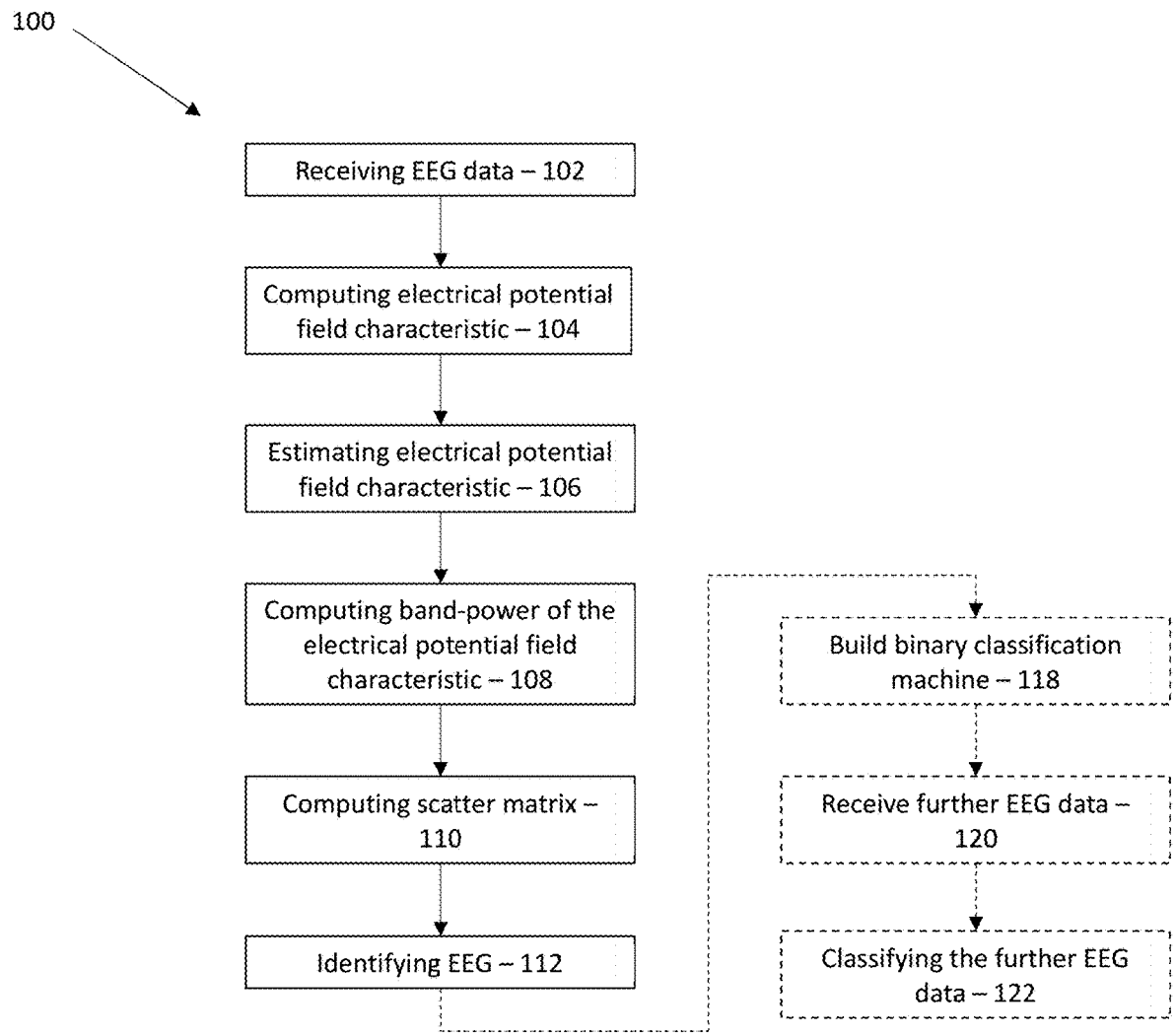
FIG. 1 is a flow diagram of a computer process of identifying and extracting pain-related electroencephalogram (EEG) signals, in accordance with present teachings.

While the present disclosure contains various embodiments of the computer processes and systems described above, there is broadly described two categories of those embodiments, namely:
(i) an adaptive and potentially participant-specific pain neuromatrix detection and analysis program. This can be achieved by exploring and identifying discriminative and robust patterns in spontaneous EEG for pain modeling and decoding; and (ii) a BCI-based pain neuromatrix activity and attention monitoring and feedback training system based on pain nociception detection and cognitive function computing with interactive audio-visual feedback and/or brain stimulation mechanism for the modulation of pain.

For the adaptive and potentially participant- or subject-specific pain neuromatrix detection and analysis program, advantage is taken of well-labeled nociception and specific cognitive and pain matrix functions of relevance in patients with chronic low back pain or lower limb pain compared to healthy controls. This helps identify discriminative and robust patterns in spontaneous EEG as well as in evoked nociception EEG for pain prospection. Accordingly, EEG data may be extracted from only those regions or locations that are useful in discriminating between EEG signals of the pain EEG class—i.e. signals that indicate the subject was in pain at the time the EEG was recorded—and EEG signals of the pain-free class—i.e. signals that indicate the subject was not in pain at the time the EEG was recorded.

In present embodiments, the modeling achieved by pain neuromatrix detection and analysis uses an experiment design involving collecting EEG signals in subjects with chronic lower back pain or lower limb pain, when compared with healthy controls—i.e. healthy or pain-free subjects—under two conditions to induce pain. These two conditions are movement induced conditions and fear-eliciting conditions.

For the BCI-based pain neuromatrix activity and attention monitoring and feedback training system, a game interface with audio-visual feedback is discussed. The game interface may inform the user of their current brain activation level and attention level. The game may also guide the user in learning to modulate the EEG characteristics and develop skills to manage attention to alleviate perceived fear-related pains.

The BCI system captures EEG signals and decodes the underlying brain states in relation to cognition and fear-related pain perception. Such decoded brain states are then presented to the participant in visual or other form to guide the participant to learn to regulate the brain states towards better pain management. For example, a participant or subject may over a few sessions learn to focus on the visual feedback while inhibiting the brain function activity in relation to fear-related pain perception.

Particular embodiments of computer processes and systems described herein are thus intended to provide:
  a. a joint attention and pain neuromatrix activity monitoring and feedback mechanism.
  b. an interactive interface to help the patient or subject learn to alleviate the perceived pain, by an audio-visual feedback-based game which informs the patient or subject of their pain and mental attention levels in real-time.
  c. an adaptive neurostimulation/feedback mechanism for pain alleviation, by learning and optimising the stimulation/feedback parameters in association with the brain-signal derived pain neuromatrix activation estimate and with empirical therapeutic effects.

In this regard, the neuromatrix is a network of neurons considered to transmit pain-related signals that result in the perception of pain Referring to FIG. 1, there is shown a computer process or method 100 for identifying and extracting pain-related EEG signals. This process 100 is based on EEG pattern recognition for pain/pain-free episodes. The computer process 100 broadly comprises:

102: receiving EEG data—the EEG data are from one or more trials each of which results in recording of one or more signals. The EEG data are labeled as being indicative of a pain state and/or a non-pain state. For example, a thirty two-channel EEG device used in a trial will output thirty two EEG signals—one for each channel. Each of the EEG signals is associated with a respective coordinate vector. That vector may be the location of the EEG device through which the trial was recorded, or may be an initial location vector set selectively or arbitrarily, to enable calculation of optimum positions for EEG sensors on the scalp.

104: determining a current density for each of the one or more signals, in the respective coordinate vector—this is computed for each signal, in the respective coordinate vector allocated to the signal. In general, the current density will be the radial current density, though other electrical potential field characteristics such as voltage potential distribution may be used.

106: estimating the current density—this is done for a set of neural activity regions of interest. The set may be arbitrarily selected or may be predetermined, to enable refinement of the regions of interest down to those regions that have a greater propensity to produce signals of relevance for distinguishing between pain EEG states.

108: computing at least one spectrum characteristic—generally a band-power—of the electrical potential field characteristic.

110: computing a mean and variance of changes in the EEG data between EEG data labeled as being indicative of a pain state and EEG data labeled as being indicative of a non-pain state, for each neural activity region of interest. This will usually involve computing a scatter matrix—in general, both the between-class scatter matrix and total scatter matrix will be calculated. However, in some instances only a single one of those matrices may be needed, and thus calculated. These matrices enable an understanding of the covariance between two or more pain-related EEG classes.

112: identifying pain-related EEG signals based on at least one said region of interest at which the variance is below a predetermined threshold.

In order to obtain the EEG pattern relevant to pain episodes, an experiment protocol was designed and conducted over an estimated total duration of approximately 1.5 hours, with the following tasks:
  i. Subject or patients (referred to as "participants" in respect of this experiment) completed a set of self-reported questionnaires [(i.e. Demographics, Numerical Pain Rating Scale (NRS), Healthcare Use, Brief Pain Interference (BPI), Pain Catastrophizing Scale (PCS), Tampa Scale of Kinesiophobia, Short Form-36 (SF-36), and Patient Health Questionnaire-9 (PHQ-9)).
  ii. Participant undergo a series of 15 physical movements.
  iii. Participant watch a series of 15 videos of individuals engaging in daily activities.

A total of 11 healthy participant and 11 patients (mixture of lower back pain and lower limb pain) took part in the experiments. EEG were captured using EEG setup 200 shown in FIG. 2. The EEG setup comprised:
  202: an EEG cap to be worn over the scalp of the subject, with EEG sensors or electrodes positioned at locations around the scalp;
  204: an EEG amplifier;

206: a backpack to enable various components of the setup 200 to be carried around during performance of the tasks described below, particularly with reference to FIG. 4;

208: an electrocardiogram (ECG) electrode to monitor cardiac condition of the subject;

210: one or more galvanic skin response (GSR) sensors to measure electrical conductance of the skin, and located, in use, on the subject's forearm;

212: a buzzer. The buzzer enabled self-registration or self-labeling of the EEG data. The buzzer may operate to simply label data in a binary manner—e.g. pain/no-pain—or to label the data in a progressive manner—e.g. click button A when the subject experiences some pain, button A again if the pain increases, or button B if the pain decreases.

The overall system or setup 200 consisted of the EEG amplifier 204 coupled with the Galvanic Skin Response (GSR) sensors module (Shimmer) 210 and secured in the backpack 206. The EEG headset or cap 202 captured electro-neurophysiologic activities in the brain related to nociception and cognitive/emotion states of attention and calmness.

This wearable BCI system was worn by the participant during the trials, with the EEG cap 202 mounted on the participant's head and the GSR sensor(s) 210 stuck on the participant's forearm.

Figure 3:
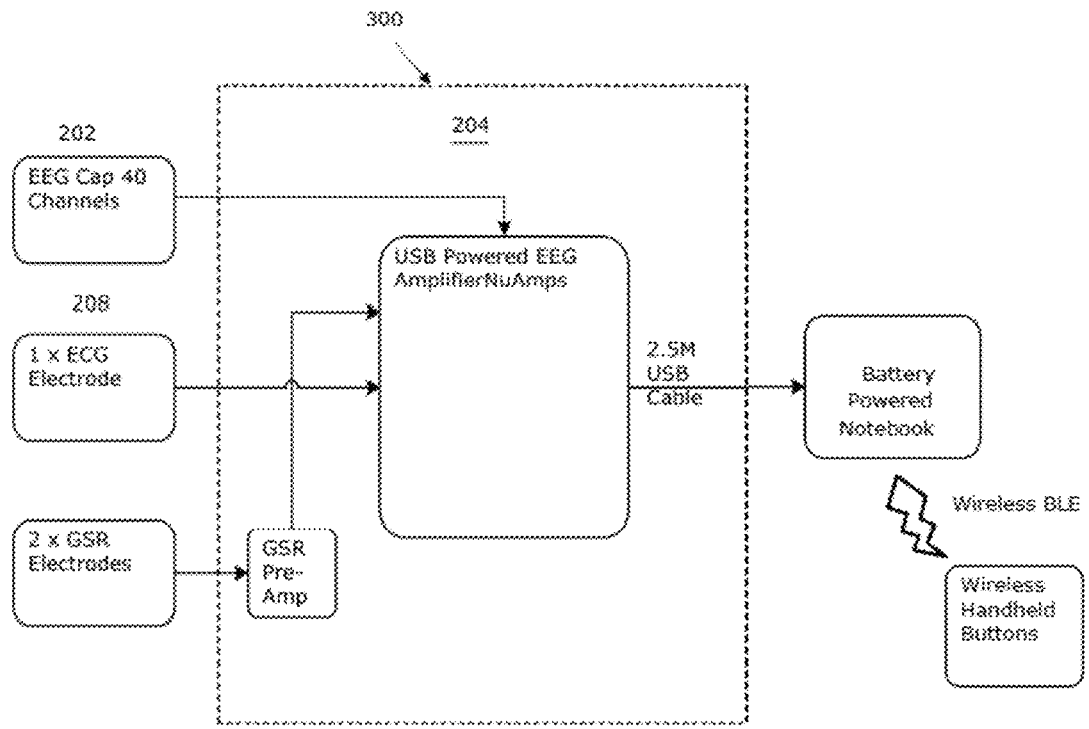
FIG. 3 is a schematic diagram of the setup of FIG. 2.

As shown in the schematic diagram 300 of setup 200 in FIG. 3, the EEG cap 202 comprised 40 channels.

Figure 2:
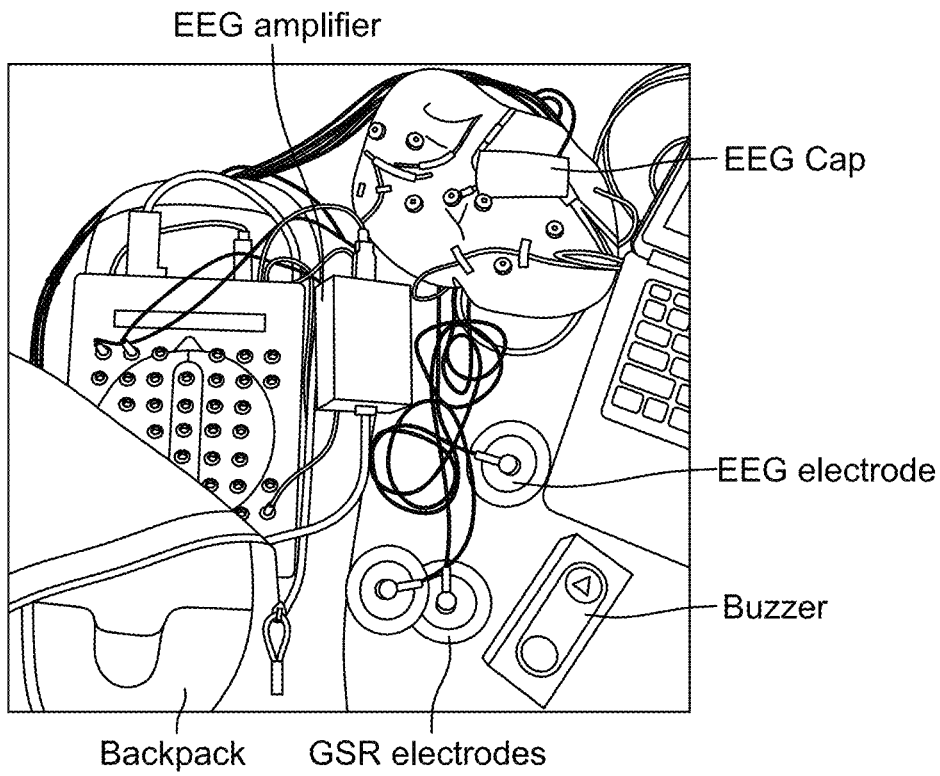
FIG. 2 is a photo of a prototype or experimental setup for capturing EEG data during performance of a specified set of activities.

The EEG cap 202, ECG electrode 208 and GSR electrode(s) all fed into the amplifier 204. Due to the comparatively faint readings of the GSR electrode(s), they were pre-amplified by pre-amplifier 302 prior to being fed to amplifier 204. The output of the amplifier 204 fed into a computer—e.g. a notebook—304 that also received signals from the buzzer 212 (wirelessly or hardwired as shown in FIG. 2). The computer 304 could therefore label EEG, ECG and GSR data based on the button condition or state of the buzzer—e.g. button A pressed/not pressed and button B pressed/not pressed—at the time of receipt of the EEG, ECG and GSR data.

During the experiments, EEG signals, pain events and pain intensity were recorded using setup 200. For the first part of the Phase 1 recording, participant (both healthy subjects and subjects considered to be patients, such a people experiencing chronic pain) were asked to perform 15 different movements to induce pain. These movements were:
1. Lifting of a box from floor
2. Picking and moving tissue box
3. Picking up dumbbells from trolley
4. Picking Box under table
5. Transferring dumbbells
6. Mopping
7. Step-up while carrying a box
8. Step down
9. Walking on treadmill with bag across front/back
10. Brisk walking on treadmill
11. Walking on treadmill with bag on side
12. Pulley with stool
13. Pulley
14. Placing of box on shelf
15. Pushing of metal trolley Before the start of each of the 15 different movement tasks, the participant watched a video clip depicting the action needed to be performed. This provided the participant a clearer understanding of the task he need to perform and ensured a greater likelihood that the action would be performed in a consistent manner.

Thereafter, the participants remained still while a baseline EEG recording of 30 seconds was taken. This still period will be used in the neuromatrix detection and analysis.

Each movement was accompanied by a therapist. During the movement tasks, the participant was advised to inform the therapist when they encountered a pain episode during the pain-inducing movement. The therapist was then able to mark the EEG segment—e.g. through a button click for electronically applying a time signature to the relevant EEG segment to label it as a segment of the pain EEG class—and instruct the participant to stop the movement for 20 seconds before continuing. This 20 seconds rest period allows the system to capture the relevant clean EEG segment that are not corrupted by movement artefact generated when the participant performed the tasks. A description of the pain, including the pain score, type of pain and area where the pain occur was also recorded.

By providing a therapist, delays that would otherwise occur for the subject needing to empty their hands and locate the buzzer 212 in order to label the data, were substantially mitigated.

Figure 4:
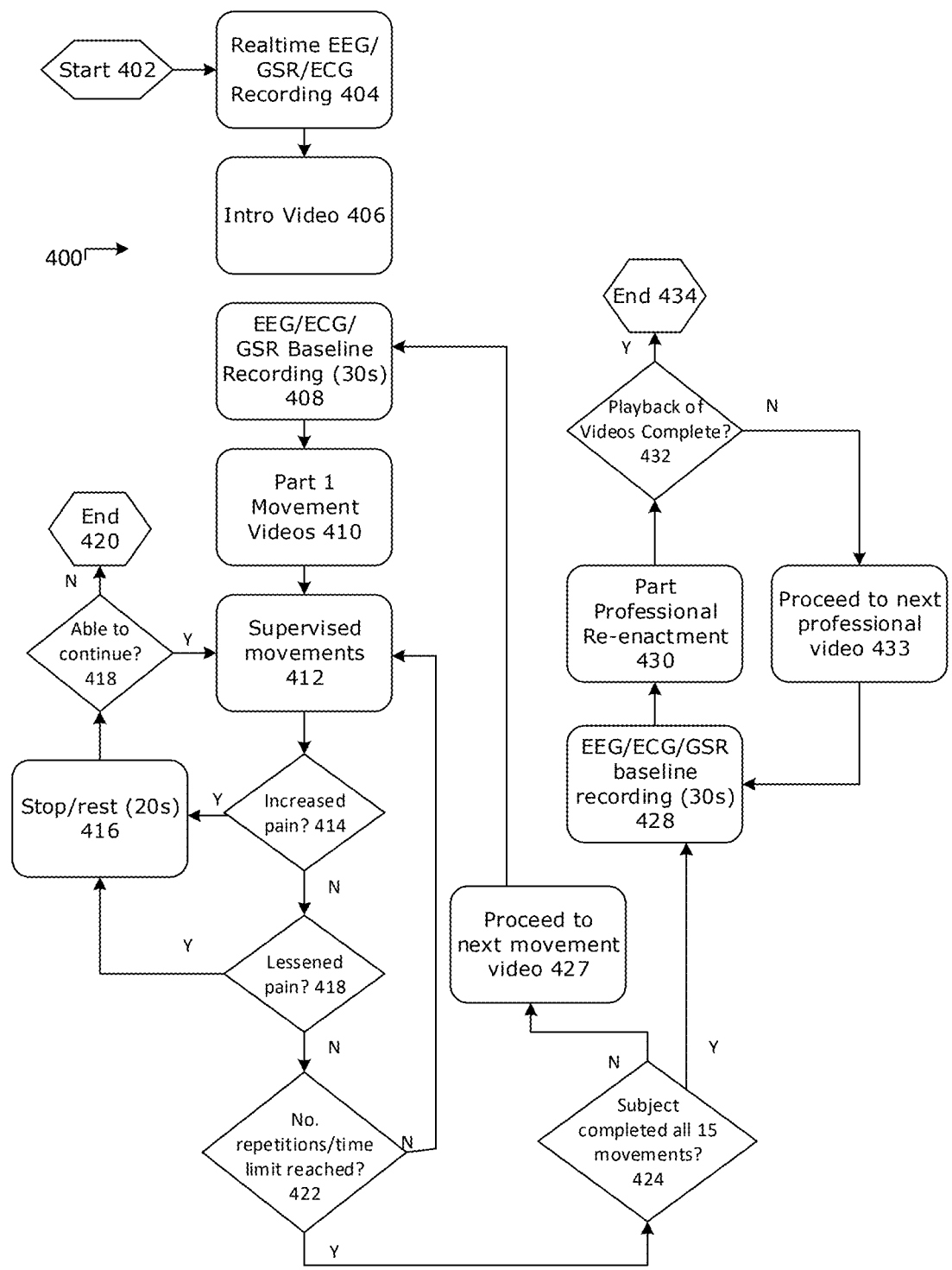
FIG. 4 is a flowchart illustrating the process for collection of EEG involved in pain-inducing activities.

The process 400 employed by the setup 200, 300 as illustrated in FIG. 4, involved identifying a start point 402 for recording EEG. EEG, ECG and GSR recording then commenced 404, and an introductory video was played to the subject 406, though this is not essential. After playing the introductory video 406, the subject remained still for 30 seconds for the system to obtain a baseline EEG recording 408.

A movement video was then played to the subject 410, to show the movement to be performed by the subject. This provided the participant a clearer understanding of the movement task to be performed and ensured a greater likelihood that the action would be performed in a consistent manner.

The subject then performed the movement associated with the video in a supervised environment—i.e. with the therapist—412 either a predetermined number of times (between 1 and any suitable number) or for a predetermined period. During performance of the movement, if the subject experienced increased pain—decision block 414—the subject was asked to stop and rest for 20 seconds—416—and the therapist will mark the EEG segment—e.g. through a button click for electronically applying a time signature to the relevant EEG segment to label it as a segment of the pain EEG class. A description of the pain, including the pain score, type of pain and area where the pain occur was also recorded. If, after the rest 416, the subject was unable to continue—decision block 418—the program would end 420. Otherwise, the subject would again proceed to perform the movement—412. If, during performance of the movement the subject experienced less pain—decision block 422—steps 416 and 418 would be repeated as described above.

If the subject's pain level remained consistent, then the subject would repeat or maintain the movement until the requisite number of repetitions and/or the predetermined time limit had been reached—424. If the subject had not yet completed all 15 movement tasks (in other embodiments, this number may be different)—decision block 426—the system will proceed to the next movement video—427. The process is repeated and the subject would again provide a baseline recording 408 and proceed through steps 410-426 until all relevant movements had been performed.

Figure 5A:
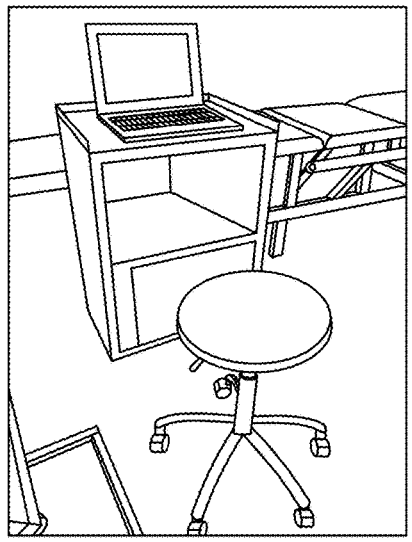
FIGS. 5a to 5d, shows various stations at which prescribed activities were performed to induce pain.
Figure 5B:
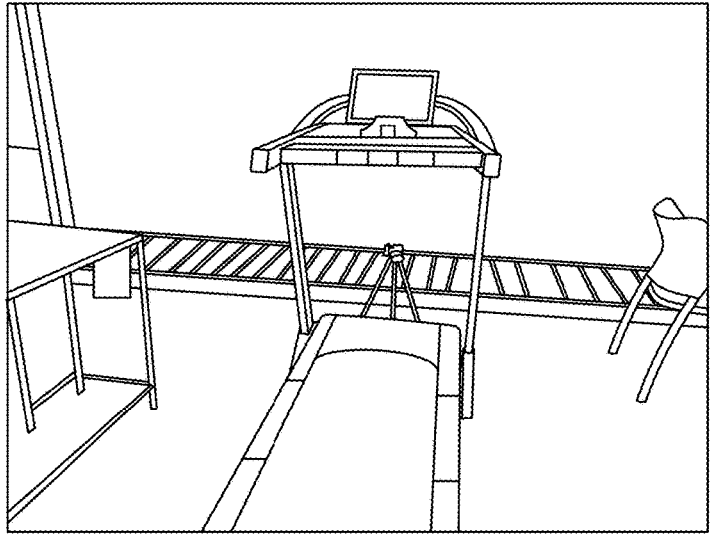
Figure 5C:
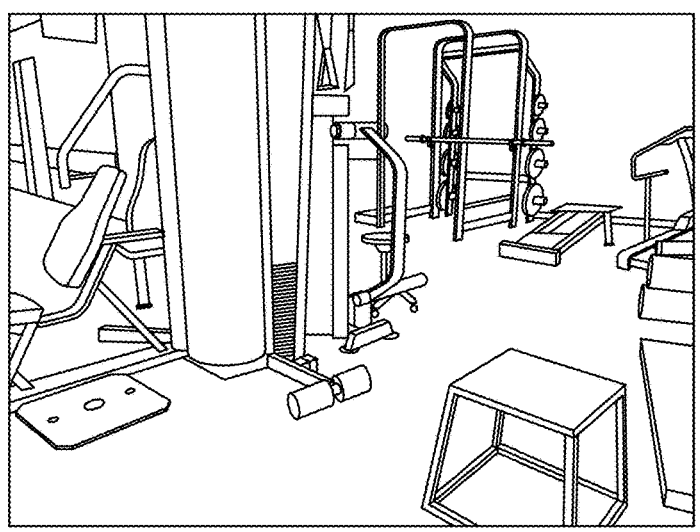
Figure 5D:
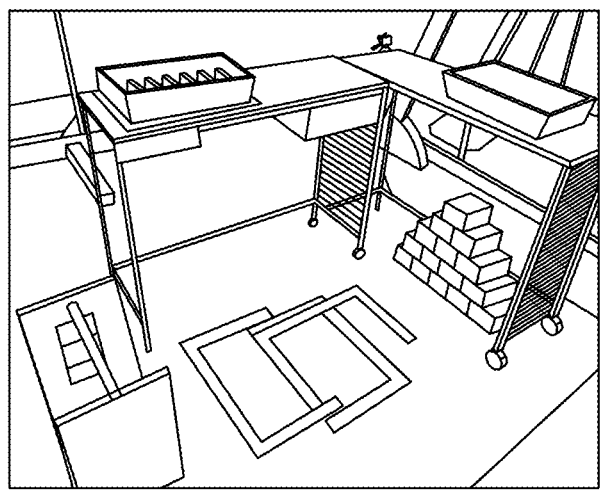

FIG. 5a shows a desk with laptop computer and rolling, backless office chair whereby the subject will sit and watch the introduction video before the movement task (in Part 1); and subsequently a series of 15 videos of individuals engaging in daily activities (in Part2). Various stations at which the movements were performed are shown in FIGS. 5b to 5d, in which: FIG. 5b is a treadmill on which the subject may be asked to walk carrying a bag in different positions; FIG. 5c shows various pieces of exercise equipment on which the extend and strength of movements could be isolated and tested; and FIG. 5d shows a series of pick and place activities with predefined locations for feet on the floor, to ensure that extension to the arms and/or back were required for some activities.

Figure 6:
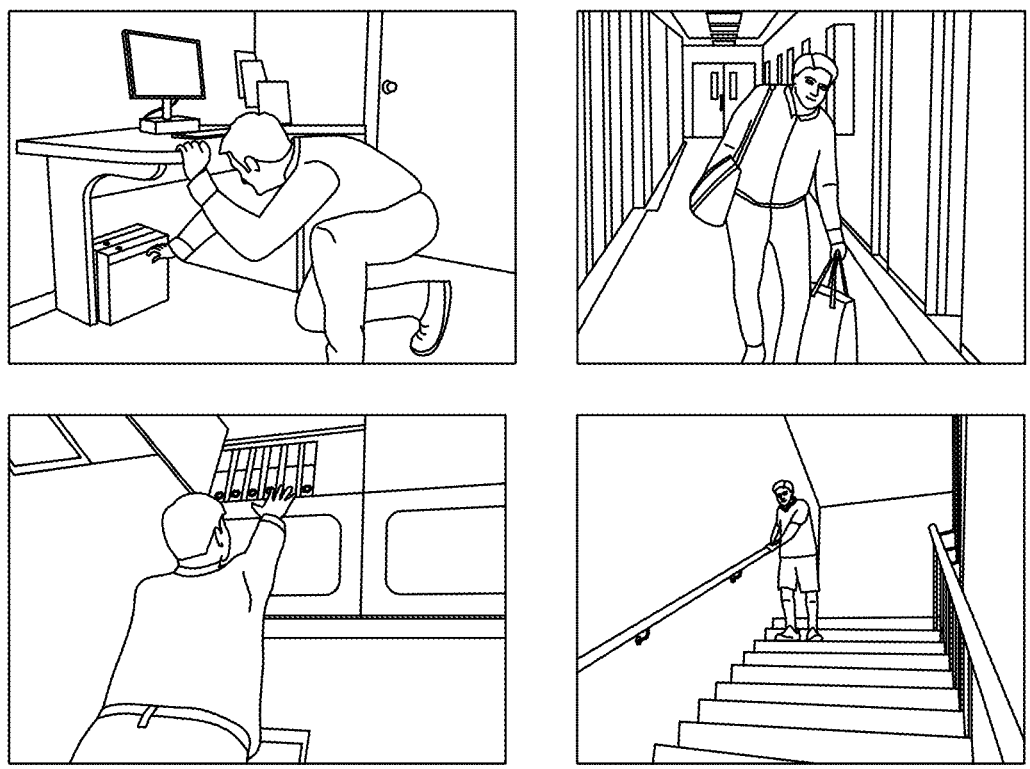
FIG. 6 is a series of still images taken from videos of an actor performing daily tasks that may induce pain.

After performance of all movements, a further baseline recording is taken—428. A video is again shown to the subject—430—and EEG recordings are taken. The series of videos, presently 15 in all, were of individual male or female actors performing tasks that mimic people engaging in daily activities that are likely to induce pain. These tasks included:
1. Man lifting a box of heavy files
2. Man carrying heavy bags
3. Man carrying a bag of heavy groceries
4. Man transferring heavy boxes to the trolley
5. Man carrying a crate up the stairs
6. Man taking down a heavy file
7. Man pushing a trolley of heavy boxes
8. Man with sprained ankle walking down stairs
9. Man flipping a mattress
10. Women lifting a box of heavy files
11. Women carrying heavy bags
12. Woman transferring heavy boxes to the trolley
13. Woman putting bedsheet at awkward corners
14. Woman unloading the washing machine
15. Woman unloading the groceries from the shopping trolley Example stills taken from these videos are shown in FIG. 6. Again, the EEG recording during video playback could be used to determine the particular activities that cause prospective pain nociception for the subject. If the full compliment of videos has not yet been played—432—then a baseline EEG recording is again taken 428 and the next video is played—433. Otherwise, the process ends 434.

The above process, when accompanied by a therapist for labeling the data and monitoring the patient, facilitated the creation of a well-labeled data set of EEG segments that could be readily separated into the pain EEG class and pain-free EEG class. In addition, the one or more the EEG collection steps 408, 428 fall within process 100, involving collecting EEG data from a plurality of trials, including one or more trials from a subject susceptible to experience pain (i.e. a patient or subject with chronic pain) and one or more trials performed by a healthy subject. Step may be avoided where, for example, EEG received at step 102 is stored in a database or memory.

In total, 11 healthy participants (i.e. subjects with no chronic pain) and 11 patients (subjects with a mixture of lower back pain and lower limb pain) underwent the experiment. EEG waveforms were screened (using visualisation and manual marking), and corrupted/noisy epochs were rejected. EEG analysis used 10-second time windows or epochs starting from each event marker (fixation, pain, less pain). The data ultimately collected and used for this analysis consisted of a total of 19 of the participants from three categories: back-pain (6 participants), lower pain (2) and healthy controls (11).

Compared to healthy controls, pain patients were found to report significantly higher pain scores (p=0.001) and pain interference (p=0.01). Pain patients also reported lower physical functioning (p=0.02), with higher role limitation due to physical health status (p=0.04). In the results obtained via the above process, there were no significant differences between pain patients and healthy controls on measures of fear avoidance of physical movements and depressive symptoms.

Figure 7:
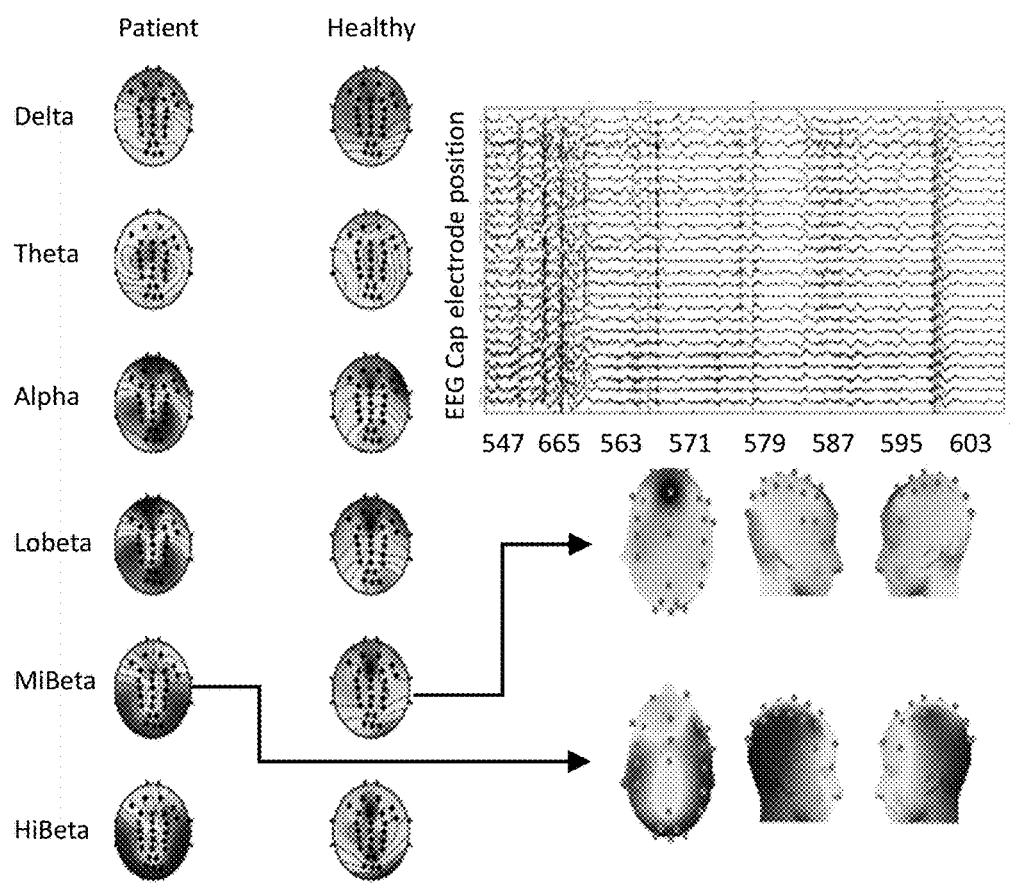
FIG. 7 shows experimental results in which a high level of activation is seen during performance of movements by subjects with chronic pain, in the alpha, mid-beta and hi-beta ranges when compared with a healthy subject.
Figure 8:
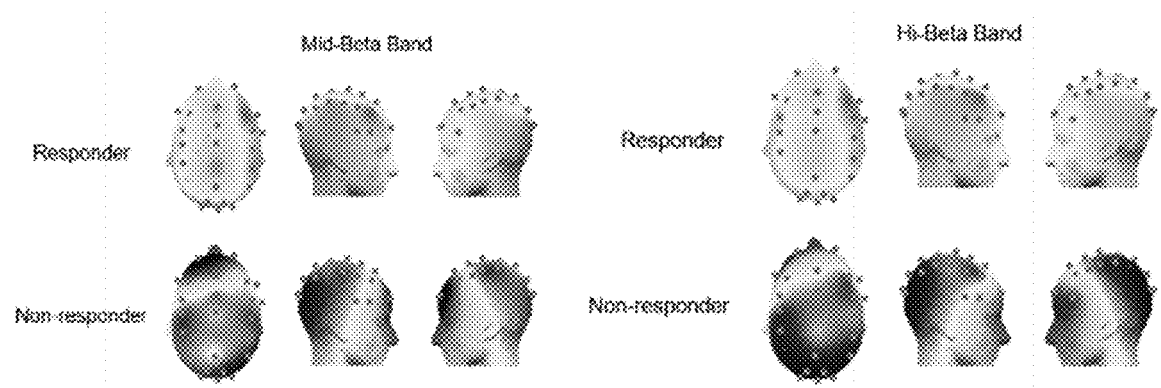
FIG. 8 shows experimental results from observing videos of actors performing everyday movements designed to induce pain.
Figure 9:
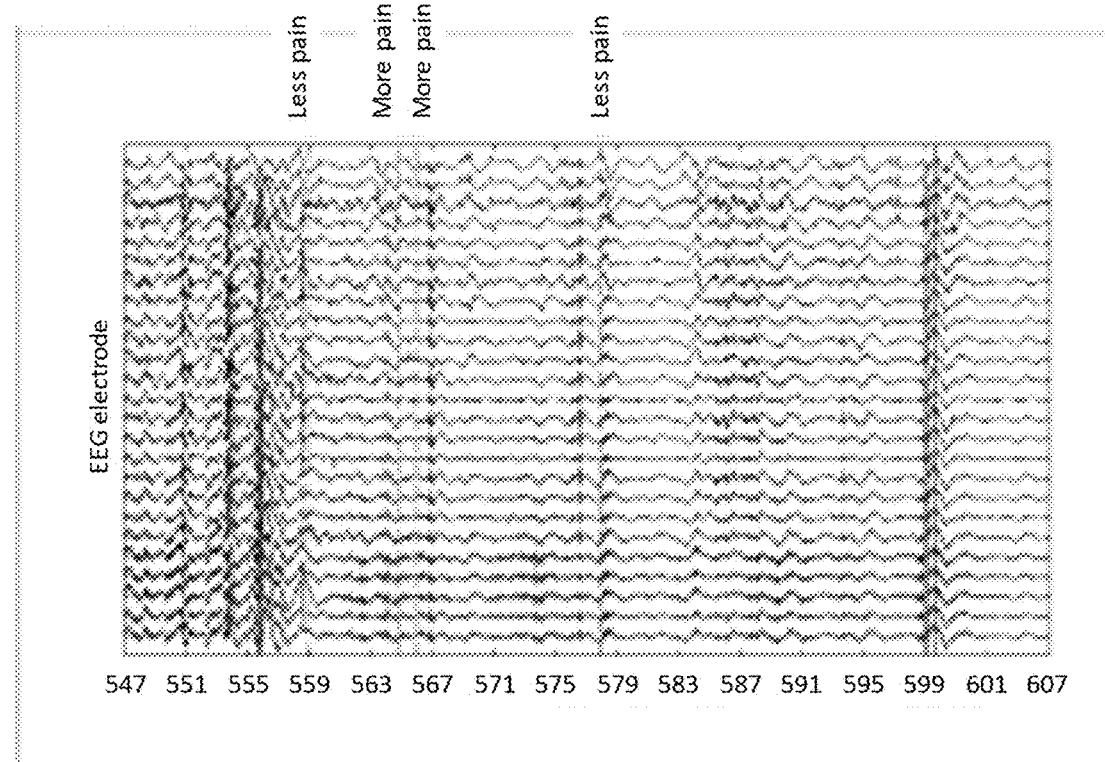
FIG. 9 shows example pain EEG epochs—the more pain and less pain events are labeled in the EEG signal.
Figure 10:
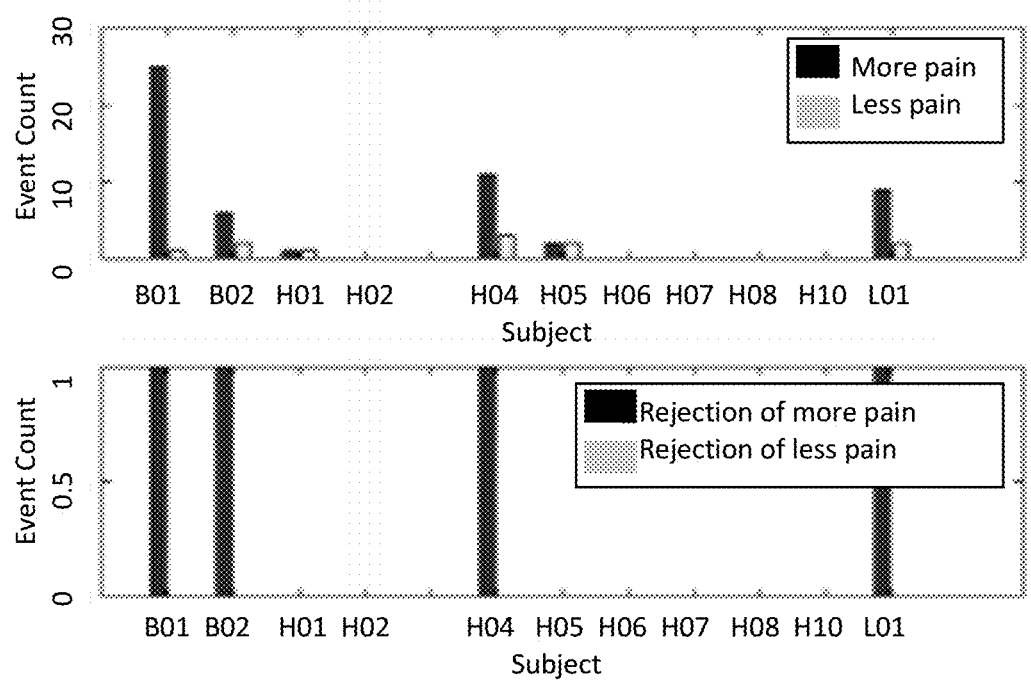
FIG. 10 shows the event counts for various pain events, with the top figure showing the total number of more pain and less pain events for each subject and the bottom figure showing the rejected pain events due to noisy EEG.

For the second task, in which patients performed the 15 physical movements, EEG brain signals were compared between healthy controls and pain patients at rest. Pain patients exhibited a higher level of activation in alpha, mid beta and hi-beta frequencies. This is especially seen in the frontal and pre-frontal areas specifically located in the right hemisphere. This is illustrated in FIG. 7.

For the third part, subjects were asked to watch videos of actors/actresses performing everyday tasks that may induce pain. Each participant watched a series of 15 videos of individuals engaging in daily activities. The results appear to indicate significant EEG pattern differences in mid and hi-beta frequencies between patients who reported pain (Responders) when compared with those that did not (Non-responders).

A current source density (CSD) estimate was computed using a spherical spline algorithm [KT06], in order to extract local EEG signal.

TABLE 1

Classification Accuracy for Pain EEG vs Non-Pain EEG

| Cross-Validation Fold | 1 | 2 | 3 | 4 | 5 | 6 | Avg |
|---|---|---|---|---|---|---|---|
| Baseline(Surface potential) | .60 | .80 | .60 | .80 | .60 | .71 | .686 |
| cDCD | 1.00 | 1.00 | .60 | 1.00 | .80 | .57 | .829 |

In this regard, after acquisition of data a pain neuromatrix modeling and decoding mechanism was implemented, based on an electrical potential field characteristic. The characteristics in the present embodiment is the current density or, more specifically, radial current density, and represents the 2nd derivative of the electrical potential field on the scalp surface. The current density was used to implement a modeling and decoding mechanism herein called the Constrained Discriminative Current Density Algorithm (cDCD).

The radial current density measures the physical quantity of current flowing along the radial direction at a particular coordinate. Consider an EEG montage of N electrodes located at spherical coordinates $E_i, I \in 1, \ldots, N$, respectively. The spherical spline surface Laplacian algorithm for Current Density Estimate (CSD) aims to recover the true current density at an arbitrary coordinate (I) by:

$$c(E) = \Sigma_{i=1}^{N} c_i h \cos(E, E_i) \qquad (1)$$

Here the array of $c_i$ must be estimated from each EEG sample z (the scalp electric potential measurement) to satisfy:

$$Gc + Tc_{0=z} \qquad (2)$$

and $$T\ c = 0 \qquad (3)$$

where G is the matrix of a g function of the angle among the N electrodes and T is the identity vector $[1,1 \ldots, 1]$.

The function cos represents the angular distance between the point E and the electrode E. And the function h is given by $$h(x) = \frac{1}{4\pi} \sum_{n=1}^{\infty} \frac{2n+1}{n^{m-1}(n+1)^{m-1}} p_n(x) \quad (4)$$

for m>1 is a constant, and $p_n(x)$ is the nth Legendre polynomial.

The CSD above can estimate the current density quantity at given spherical coordinates. However, it does not answer which coordinates, i.e. which brain (note that CSD is usually sensitive to low-depth sources only) voxels may show neural activities associated with particular mental tasks/conditions.

The modeling framework described below, based on CSD, can be used to identify the neural activity regions, referring to those involved in the pain perception and cognition process.

For simplicity, it is assume that the $\{ci(t)\}$ values have been computed for each EEG time-sample. A set of neural activity regions of interest: $L=\{I_1, I, \ldots\}$ can then be evaluated—the coordinate vectors in the process 100 may be set to be respective ones of the neural activity regions of interest. The CSD values at the neural activity regions of interest can then be calculated using the above equations, to obtain $\{cj(t)\}$.

Here we consider oscillatory activities in these CSD estimates, in the $k^{th}$ trial (instance) of a mental task/condition, with M samples of EEG (sampled at $\{t\}$). The average power of cj(t) in the trial is then computed and denoted by $d_k(I_j)$.

Now consider the classification/detection scenario in which contrasting neural activities need to be identified, between a mental task class $\omega_0$ and another class $\omega_1$. This can require an understanding of the covariance of properties relating to the two tasks. The mean and variance of the CSD power values d(t) in each class can be determined and its discriminative power formulated using the multi-variate Fisher's score:

$$f(L)=\text{trace } \{S_b(S_t+\gamma I)^{-1}\} \quad (5)$$

where $S_b$ and $S_t$ are the between-class scatter matrix and the total scatter matrix, respectively, and $\gamma$ is a positive regularisation parameter.

Therefore, we formulate the modeling of optimal CSD coordinates as:

$$\arg\min_L f(L) \quad (5)$$

According to the foregoing, computing f for a given L involves:
- (nonlinear step) compute $h_i(L)$ for every electrode and each CSD coordinate in L;
- (linear step) compute the estimate of CSD $c_j$ of each EEG time sample and each CSD coordinate using precomputed $\{c_i\}$;
- (nonlinear step) compute the average power of CSD in each trial: $d_k(I_j)$;
- (nonlinear step) compute the scatter matrices $S_b$ and $S_t$
- (nonlinear step) compute the Fisher's score.

Therefore, the steps are predominantly non-linear in this optimisation problem.

To reduce computational load and to improve robustness, the solution of L was limited to a plausible range, or range of interest. This was achieved by placing an upper and lower bound of the region, in spherical coordinates, over which to optimise. The modeling and optimisation problem was therefore recast as:

$$\arg\min_L f(L), \text{ subject to } \Sigma_z u(I_i, b)=0 \quad (7)$$

where b is the parameter that defines the plausible coordinate region in the spherical space, and u is a step function: if the location vector $I_i$ is within the region, the function value is 0, otherwise it is 1 or any arbitrary non-zero value In a practical application of the cDCD methodology, the process 100 involved investigating or monitoring the following rhythmic activities: Theta: [4 8]; Alpha: [8 12]; Lo-Beta: [12 16]; Mid-Beta: [16 24]; Hi-Beta: [24 32]; Delta: [1 4]. Welch's method was used to compute a power spectrum of the average CSD power value at discrete frequency points (from 256-point FFT for the sampling rate of 250 Hz) in each trial (dk), and the sum of the powers from all the frequency point within a specific band was then used.

In total, there were 32 trials (instances) of non-pain and pain epochs. A 6-fold cross-validation test of classification was run, using either the CSD-band-power features or band-powers derived from scalp potentials. A linear support-vector-machine (SVM) was employed as the classifier, using the Matlab statistics toolbox.

In the current implementation of cDCD, a simplified version was considered in which the L coordinates are the same as the coordinates of the electrodes. Thus the optimisation was reduced to the portion of the spherical coordinate system within the area of the respective electrodes. Despite this result not be as ideal as solving the objective equation (7), limiting to the electrode coordinates enabled evaluation of a solution, albeit a potentially less optimal one, and comparison thereof against the baseline.

With reference to Table 1, the accuracy rates in each fold are compared, and the accuracy rates in the average. The proposed method yields a significant increase in detection accuracy from 68% to 82% when compared with the average.

It is considered that this sub-optimum cDCD, if used as the initial solution for the optimisation procedure as optimisation approaches the objective optimisation afforded by Equation (7), will obtain increasingly more accurate solutions for the EEG classification.

As mentioned above, the second category is a BCI-based pain neuromatrix activity and attention monitoring and feedback training system.

A similar arrangement to setup of FIG. 2 may be used for this process. In particular, the overall BCI based pain neuromodulatory therapy using joint attention and pain neuromatrix activity monitoring and feedback training system 1100, shown in FIG. 11, consists of a computer 1102 (which can be a desktop, a laptop or a tablet) connected to an EEG amplifier 1104 and an EEG cap 1106. The EEG cap 1106 is meant to be worn by the participant.

The operator helps the participant to put on the EEG cap 1106 and apply gel on the electrodes. After which, the operator will start the BCI client software application in the computer to check the impedance level of each electrode to ensure good connectivity. Thereafter, scalp EEG signals can be acquired. In addition, there is an USB joystick to allow the user to play the EEG Attention/Pain feedback game running on the computer 1102.

Figure 12:
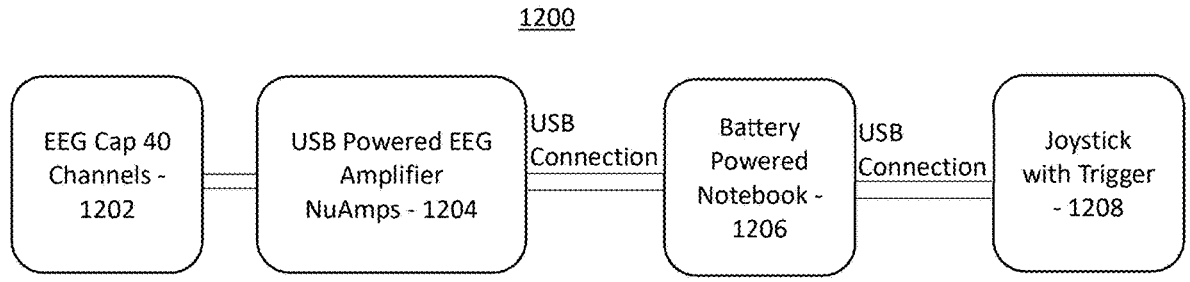
FIG. 12 is a system diagram of the system of FIG. 11.
Figure 13:
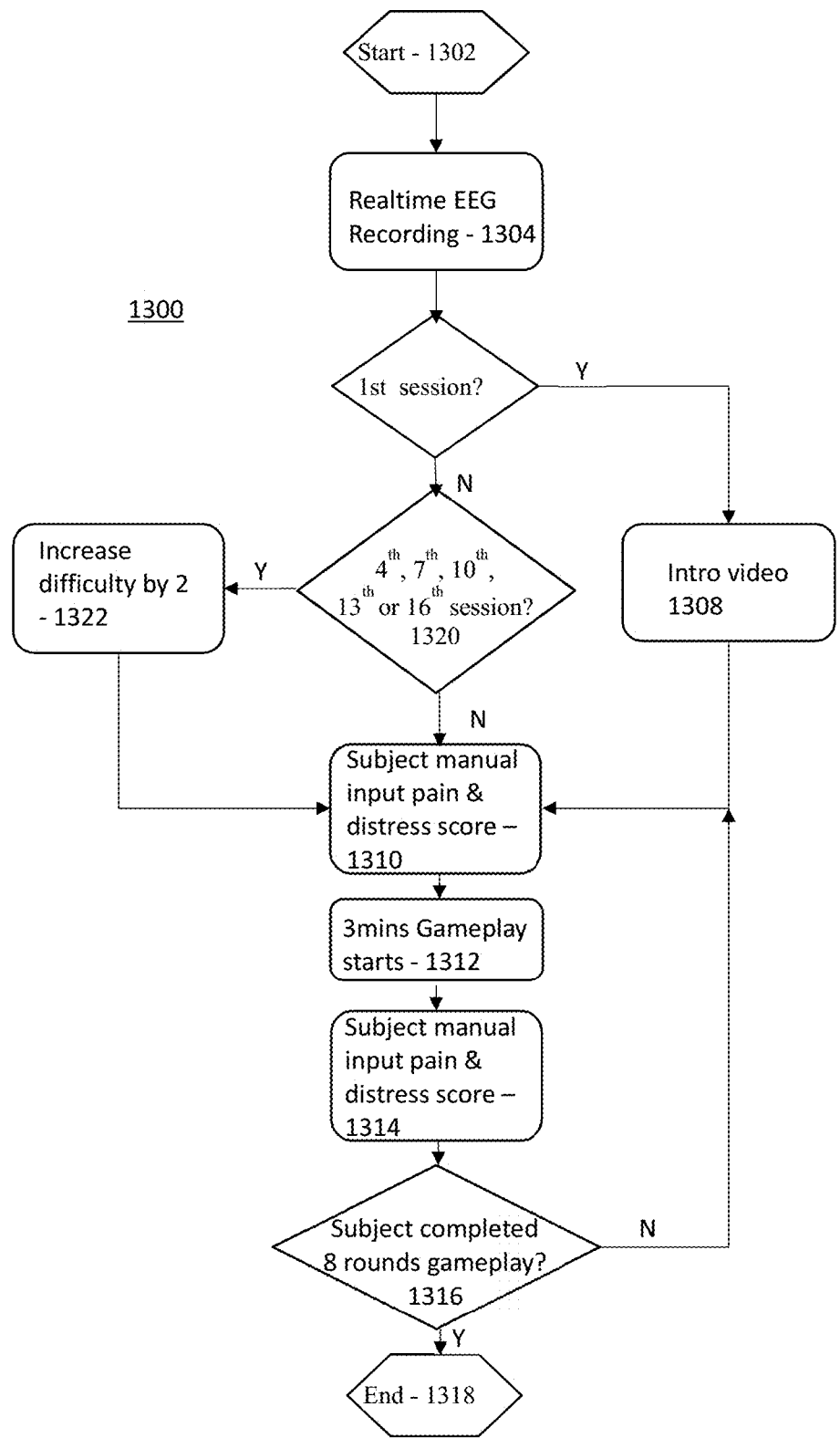
FIG. 13 is a flowchart of use of the system of FIGS. 11 and 12.

A system diagram 1200 illustrating system 1100, is shown in FIG. 12. In this embodiment, the cap 1202 comprises a 40 channel arrangement that feeds into amplifier 1204. The amplifier 1204 sends the amplified signal to computer 1206, and the user interacts manually with the computer 1206 via joystick 1208.

After setting up the system on the user, process flow 1300 is commenced—1302. Real-time EEG recording is then starting—1304—to correlate attention and pain or wellness scores with EEG obtained during interaction with the computer 1206.

Initially, if the session is the first session for this experiment—1306—the user is presented an introductory video—1308. The subject then manually inputs pain and/or distress levels to establish a baseline from which to progressively develop the wellness score—1310. The user then plays the game for a predetermined period—presently 3 minutes—1312, and again specifies their pain and/or distress levels—1314. If, after the end of the gameplay period, the subject has completed 8 (or some predetermined number) rounds of gameplay—decision block 1316—the process ends—1318. If the subject has not completed 8 rounds of gameplay, steps 1310 to 1316 are repeated. In some instances, performing both steps 1310 and 1314 between each round of gameplay may not be necessary and, instead, only one round is performed.

For the second and subsequent sessions, the subject performs the same steps 1310 to 1316. However, at predetermined stages, the difficulty level of gameplay may be increased to develop the subject's cognitive pain management capability. For example, the difficulty level may be increased every 3k+1 sessions: k ∈ N (natural numbers)—e.g. $4^{th}$, $7^{th}$, $10^{th}$, $13^{th}$ and $16^{th}$ sessions (step 1320) by two (step 1322).

Attentional strategies whereby a person is told to deliberately direct and maintain their attention away from the pain might be the existing psychological strategies traditionally offered by clinician as a way to reduce pain and pain related distress. The patient will try to redirect attention focus by thinking about something else, or try to alter its meaning, context, motivational relevance, or importance. Layman examples are statements such as "Try not to focus on the pain all the time" or "Think of something positive" that are perhaps the most common pieces of advice given to chronic pain patients. But such strategies lack feedback to advise patients on whether they correctly performing the treatment, and how much, or how much more, the patient should be doing.

Figure 14:
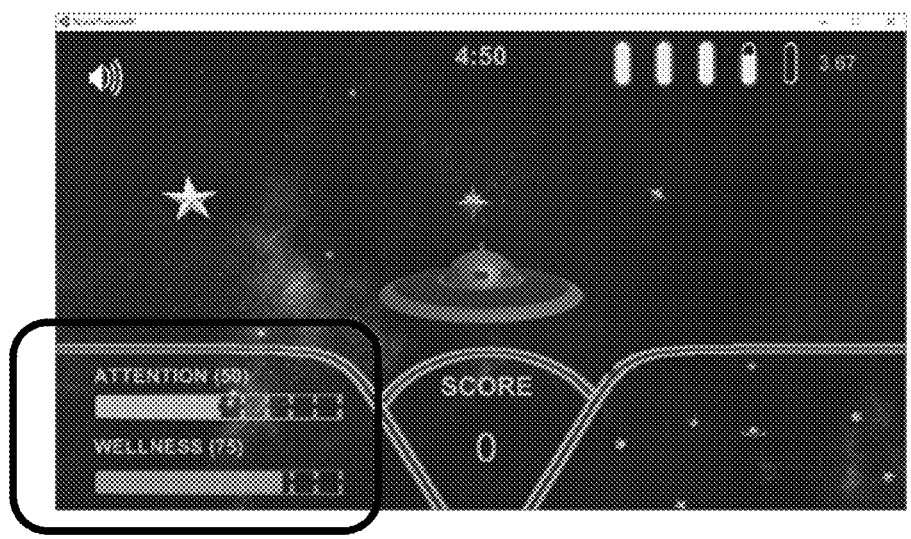
FIG. 14 is a user interface for gamification of wellness and attention score presentation in accordance with present teachings.

In the present system, two modularities are used, namely an attention score and the pain neuromatrix (wellness) score—these scores are highlighted in box 1400 of FIG. 14. These scores enable patients to practise an individualized pain management strategy. Moreover, particularly during gameplay a patient receives visual feedback of performance and, as such, has a comparatively objective measure of success in their carrying out of therapy.

The participant will be instructed to focus and sustain their concentration to improve the attention score. When the system detects that the participant may be in pain, the wellness score will go down and the participant is advised to practice pain-management strategies taught by their clinician or therapist. These strategies may include cognitive behaviour therapy, breathing techniques, and other tailored management strategies. This visual feedback mechanism provides the subject with a more direct and informative response. One that informs them whether such pain-management strategies work and thereafter allowing them to translate or use these strategies more effectively in their day-to-day activities.

Figure 15:
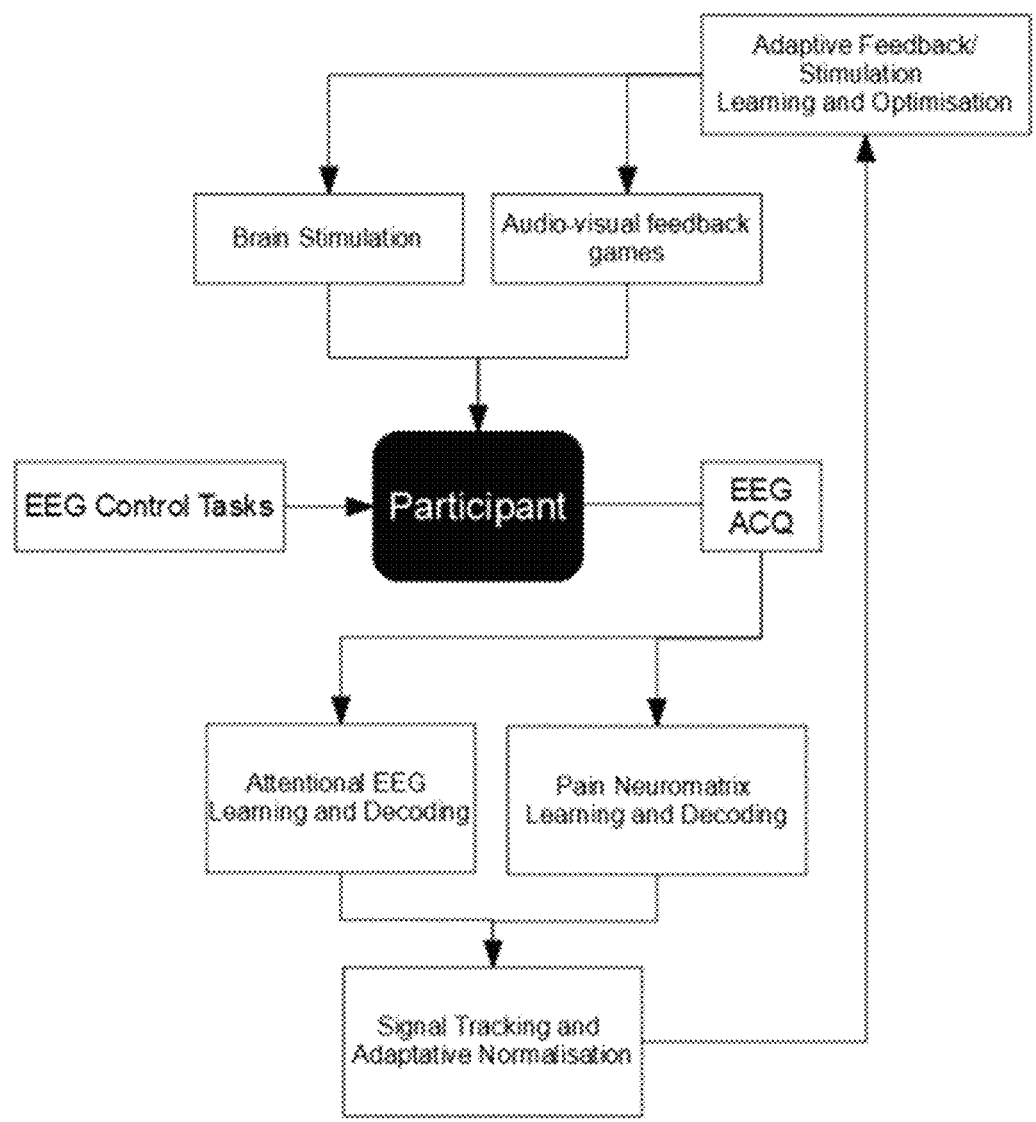
FIG. 15 is a flowchart illustrating a method for non-drug based chronic pain management in accordance with present teachings.

This approach is outlined in FIG. 15, for a closed-loop sensing and neural feedback/stimulation mechanism or system for pain neuromodulatory training/therapy. To make the approach readily capable of incorporation into daily life, non-invasive EEG data is acquired through the EEG Acquisition (ACQ) module, and the data is processed to identify the attention score and wellness or pain score as set out below.

Various approaches have been previously proposed for the detection of attention (i.e. concentration). See, for example, U.S. Pat. No. 8,862,581 entitled "Method and system for concentration detection", the entire contents of which is incorporated herein by reference. This prior art citation should not be taken as common general knowledge.

The method for determining an attention score—e.g. for an EEG epoch taken from a time series of EEG epochs—involves detecting concentration by:
- extracting temporal features from brain signals—i.e. one or more EEG epochs;
- classifying the extracted temporal features using a classifier to give a score $x_1$;
- extracting spectral-spatial features from brain signals;
- selecting spectral-spatial features containing discriminative information between concentration and non-concentration states from the set of extracted spectral-spatial features;
- classifying the selected spectral-spatial features using a classifier to give a score $x_2$;
- combining the scores $x_1$ and $x_2$ to give a single score; and
- determining if the subject is in a concentration state based on the single score.

Some methods other than that set out above may be known to the skilled person, and such methods are intended to fall within the scope of the present understanding of determining an attention score.

In addition to the attention score, the wellness score must be determined as discussed above. To achieve this, the one or more processors of the system implement a pain neuromatric modeling and decoding engine to determine the trainee wellness score. This is done in two phases. Phase A is for the neuromatric modeling through data collection and learning. Phase B is for decoding.

Data collection and learning phase A involves collecting pain-free and pain EEG data from patient group and healthy group—i.e. receiving EEG data.

Automated and/or manual EEG screening is then performed to select clean EEG episodes or epochs of at least N seconds long (preferred value N=20, as in our study) after each pain onset event. These may be extracted from the trials discussed above in relation to FIG. 4.

An optimum set of scalp (cortex) locations are then identified, where the current density contains the most informative features about pain EEG in contrast to pain-free EEG. This may involve implementing the method 100, by setting an initial set of scalp locations, denoted by L (or $L_{initial}$)—a spherical coordinate vector for each location. A numerical optimisation algorithm is then run to search for optimal L values using this objective function:

$$\mathrm{argmin}_L f(L), \text{ subject to} \sum_z u(l_i - b_1) + \sum_z u(b_0 - l_i) = 0$$

where f is a function for evaluating the discriminative power of L, and the constraint term indicates that L must be in a plausible region bounded by $b_1$ and $b_0$.

The f function is given by a multi-variate Fisher's score:

$$f(L) = \mathrm{trace}\{S_b(S_t + \gamma I)^{-1}\}$$

where $S_b$ and $S_t$ are the between-class scatter matrix and the total scatter matrix respectively, computed as set out below, and γ is an optional positive parameter for regularisation. The two matrices are computed by the following steps:

Presently, transformation matrices G and H are generated to be used for the spherical spline interpolation of surface potentials (G) or current source densities (H) for the locations or regions of interest L.

The EEG data is then transformed into a current density estimate using the spline interpolation matrices. Presently, the selected EEG waveform (potentials) are transformed into a current density estimate using the matrices G and H, to obtain the current density estimate as a matrix X of size nC by nT–nC is the number of spatial points on the scalp at which the estimate is conducted and nT is the number of time samples in each pain-free or pain episode.

Band-powers are then computed for the current density estimate. Presently, a vector of band-powers of each current density time series x(t) is computed using either Fourier-transform based decomposition, or energy computation after a band-pass filter array. The frequency bands can be empirically set (e.g. based on known brain signal frequencies) to maximize system performance, or using the traditional EEG bands including delta, theta, alpha, low-beta, mid-beta and high-beta.

The between-class scatter matrix and the total scatter matrix can then be calculated using the band-powers for the current density estimate. For example, the total scatter matrix $S_t$ can be computed using all the samples of band-power vectors. Similarly, calculating the mean band-power vectors for the pain EEG class and for the pain-free EEG class, enables computation of the the between-class scatter matrix $S_b$.

The optimal L is obtained. The optimal L is the location/region at which the radial current density is considered to have highest discriminative power between signals of the pain EEG class and signals of the pain-free EEG class.

The optimised L can then be used to compute the current density time series x(t).

A binary classification machine is then built (step 118 of FIG. 1) to discriminate between at least two pain-related EEG states—these states are a pain EEG class (i.e. a state in which the EEG indicates the subject is experiencing pain) and a pain-free EEG class (i.e. a state in which the EEG indicates the subject is pain-free). The binary classification machine can be any suitable binary classification machine, such as a support vector machine, multi-layer neural network, generalised linear discriminant analyser and others.

The classification machine is selected and trained so that it is able to produce a score, termed the pain neuromatrix activation score (rPNAS). rPNAS takes positive values for the pain-EEG class samples, and negative values for the pain-free EEG class.

The pain EEG model developed by learning from the EEG data via the process set out above thus comprises or consists of: L, being the coordinates of current density estimate points, and the associated G and H matrices for current density estimate (these matrices are discussed in Perrin, F., Pernier, J., Bertrand, O., Echallier, J. F. (1989), "Spherical splines for scalp potential and current density mapping. Electroencephalography and Clinical Neurophysiology" the entire contents of which is incorporated herein by reference), the specified bands and band-power calculation method, and the classification machine model.

Phase B involves decoding. Decoding relies on receiving further EEG data per step 120 of FIG. 1, and classifying that data according to step 122 of FIG. 1. In the present embodiment, decoding assumes a continuous stream of EEG samples are received. The series or stream of EEG samples is converted into a new time series indicating the raw pain neuromatrix activation score (rPNAS) at each time point.

If the EEG montage is same as in Phase A, the algorithm can reuse the same transformation matrices G and H for the spherical spline interpolation of surface potentials (G) or current source densities (H). Otherwise, the two matrices must be recalculated as set out above, using the L and the new montage.

In general, only clean EEG data should be processed. For each new EEG sample, EEG sample rejection is therefore performed. Thereafter, at a fixed interval (e.g. every N samples or t seconds), a time-windowed EEG segment (e.g. EEG epoch) is extracted, and EEG segment rejection is performed if certain EEG samples are corrupted. In the present implementation, any ocular artefacts or other excessive artefacts will cause rejection of the whole segment. The data is therefore clean.

The EEG sample is transformed into the current density estimate using the matrices G and H, to obtain the current density estimate as a matrix X of nC by nT. As mentioned above, nC is the number of spatial points on the scalp at which the estimate is conducted, nT is the number of time samples in each pain-free or pain episodes.

The vector of band-powers of each current density time series x(t) is then calculated using the same method as in the Phase A. The classification machine can then be used to transform the band power vector into rPNAS.

For the treatment of pain, the following process is used based on the foregoing classification scheme. The treatment of pain can be through a gaming interface with audio-visual feedback and/or brain stimulation. Signal tracking and adaptive normalization will perform pre-processing of the acquired EEG signal.

Adaptive feedback and/or simulation modeling and optimization is performed to calculate scores and parameter for the brain stimulation and audio-visual feedback games. Assume the set of neurostimulation parameters is described by a vector V, and the objective of the adaptive stimulation mechanism is to manage rPNAS within a threshold (empirically determined). For the closed-loop study, rPNAS is used as the target metric to be optimised (minimised per arg min f(L)) instead of heart rate, and the response to a particular stimulation configuration is a dynamic process.

This learning can be applied to an individual person/patient/subject or a group of people (including the general populous). This is again done in two phases whereby the EEG acquisition and the neurostimulation device are attached to the person.

These phases are a training phase—Phase A, involving generating a number of random values for the stimulation parameter vector $V_j$. For each of the parameter vector, the stimulation pulses are generated, and the EEG samples (i.e. response) with respect to the stimulation are collected. The abovementioned decoding method can then be used to compute the rPNAS time series.

After testing all the random Vj (and optionally repeating a few times to optimise), all the rPNAS time series data is collected along with the associated stimulation parameter vector Vj.

Machine learning is used to build a recursive regression model that associates the stimulation parameter vector V with the response of rPNAS (a time series or particular time points). The particular regression model mechanism can be empirically chosen to achieve best prediction of rPNAS response. The regression model may be, for example, a recursive neural network (such as long short-term memory), a linear transfer functions, or any other suitable model.

The second phase—Phase B—is the adaptive phase. In this phase, the current rPNAS is measured using the above-mentioned decoding method. A baseline for rPNAS and will be established—e.g by the operator—and a target rPNAS range is set as prescribed by a consultant. This ensures pain management is within predetermined bounds that enable smooth development of the subject's cognitive ability to manage pain.

The algorithm chooses the optimum parameter vector Vj according to the said recursive regression model. The optimisation performed by the algorithm may consider both the rPNAS control as well as the stimulation electric power if brain stimulation is used.

The resulting gaming feedback and/or stimulation is then delivered and the rPNAS measurement is tracked. The measured or observed rPNAS measurement is used to update the recursive regression model.

A brain stimulation engine is used to determine the frequency, duration and pattern of non-invasive stimulation, so as to maximize the efficacy of the stimulation for chronic pain therapy. The brain stimulation can be transcranial direct current stimulation (tDCS), vagus nerve stimulation (VNS) or repetitive transcranial magnetic stimulation (rTMS). Audio-visual feedback games provide a gaming strategy for the trainee or subject to manage their pain. In the example shown, interactive activity is displayed on a display in an interactive computer gaming environment. The trainee or subject is assigned EEG control tasks to achieve the goal (such as shooting down as many as targets as possible in a space hunter game) using EEG activities for specific game controls.

Figure 11:
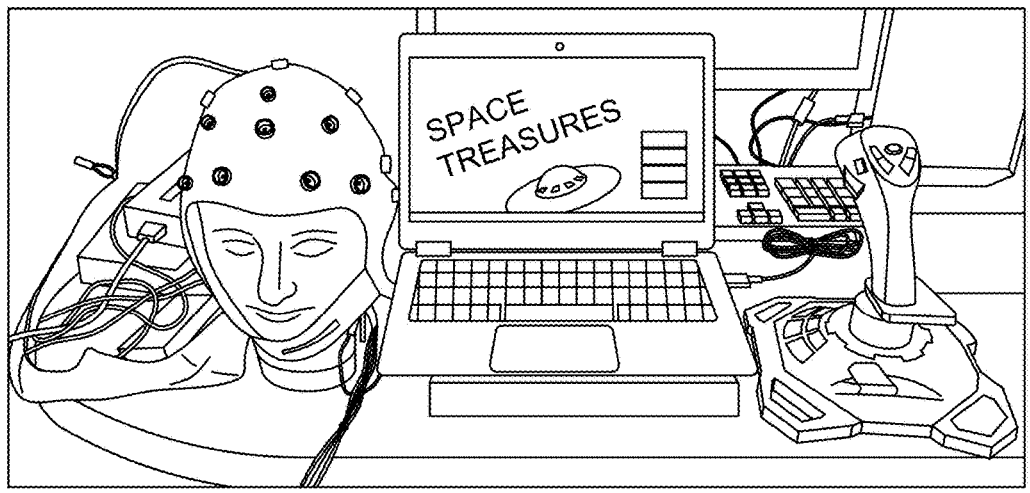
FIG. 11 is a photograph of a setup of a training system for BCI based pain neuromodulatory therapy using joint attention and pain neuromatrix activity monitoring and feedback, in accordance with present teachings.
Figure 16:
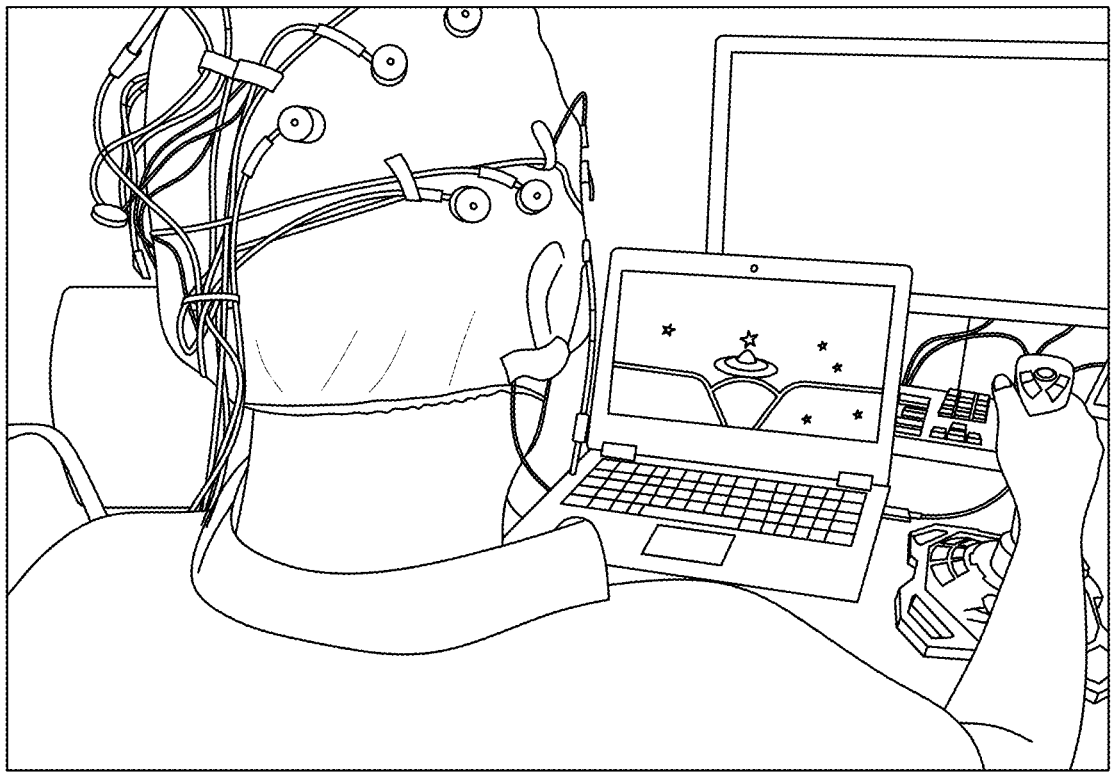
FIG. 16 shows a participant in a gamified treatment regime, wearing an EEG cap playing the space game on a laptop with a joystick.
Figure 17:
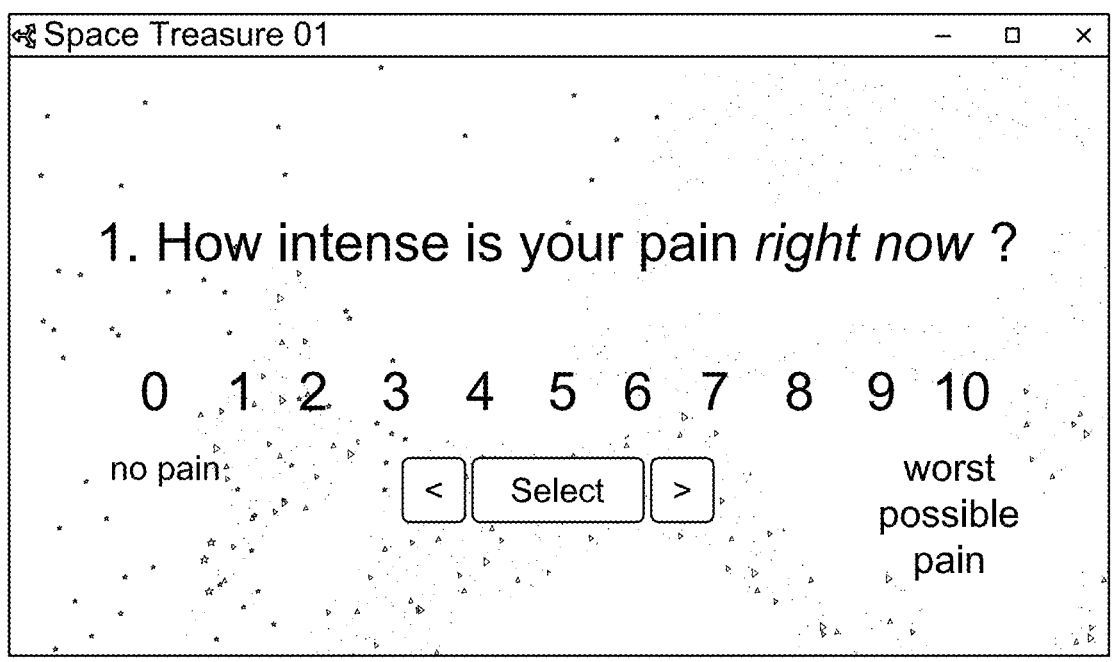
FIG. 17 shows a user interface displaying a first question to assess the pain level of the subject.
Figure 18:
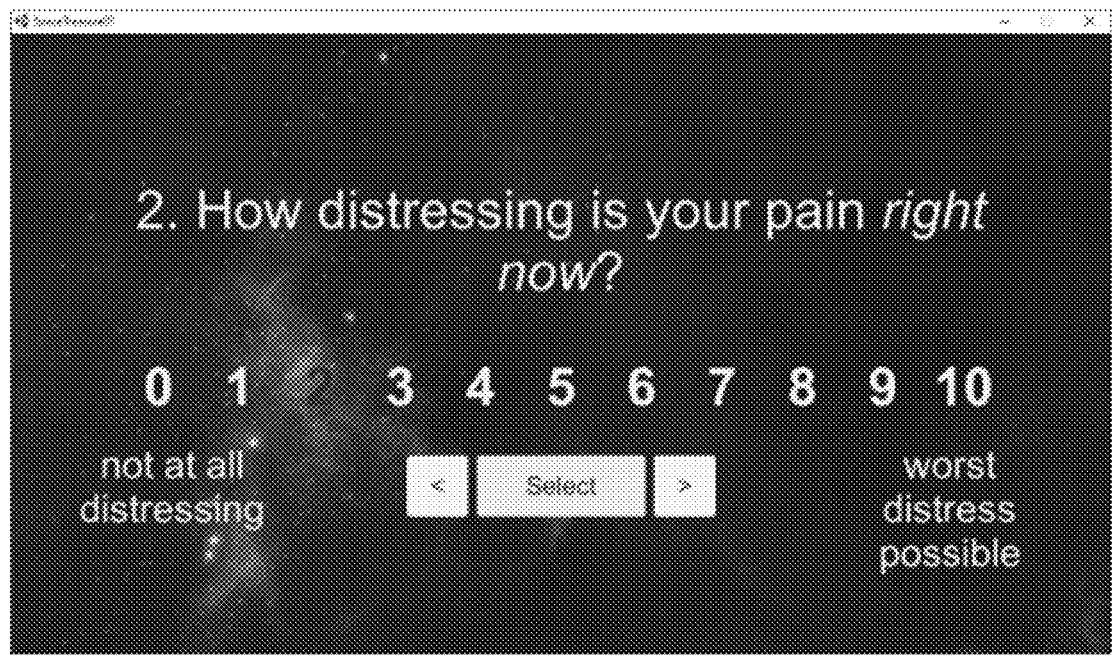
FIG. 18 shows a user interface displaying a second question to assess the pain level of the subject.
Figure 19:
FIGS. 19 to 24 provide a display showing an in-game user interface displaying an attention score, a wellness or pain level assessment score and an interactive activity.
Figure 20:
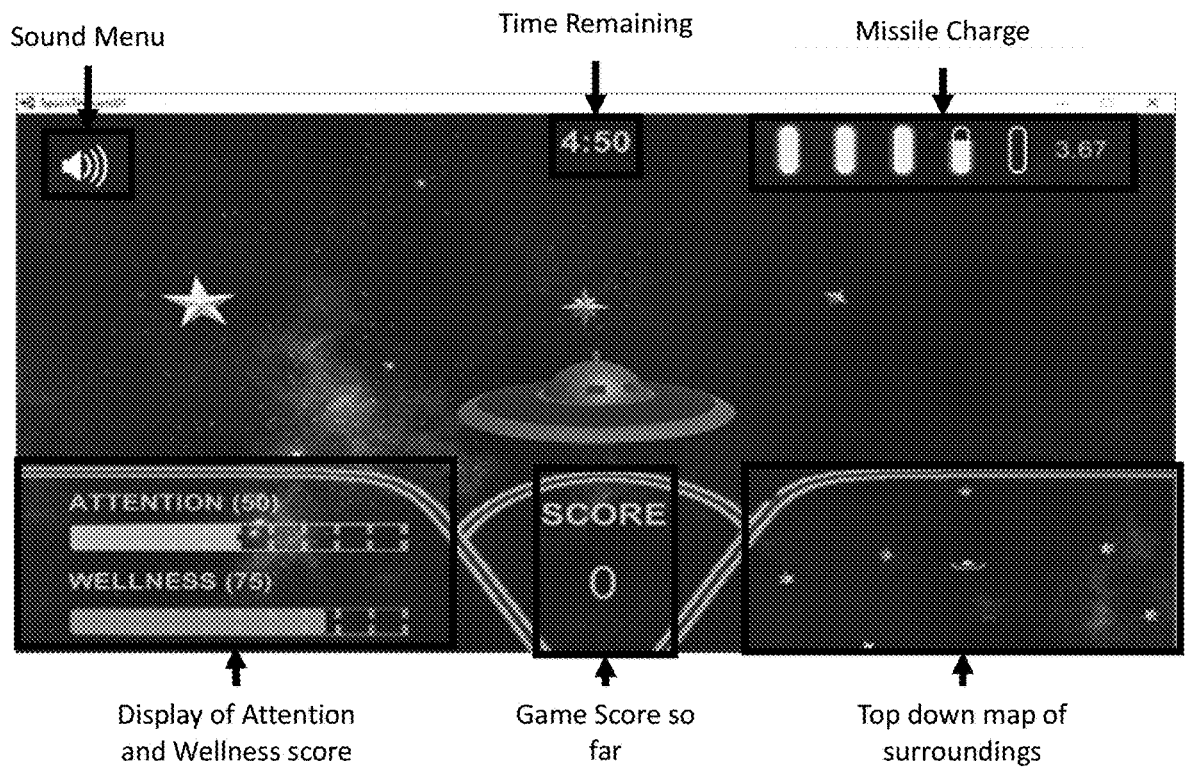
Figure 21:
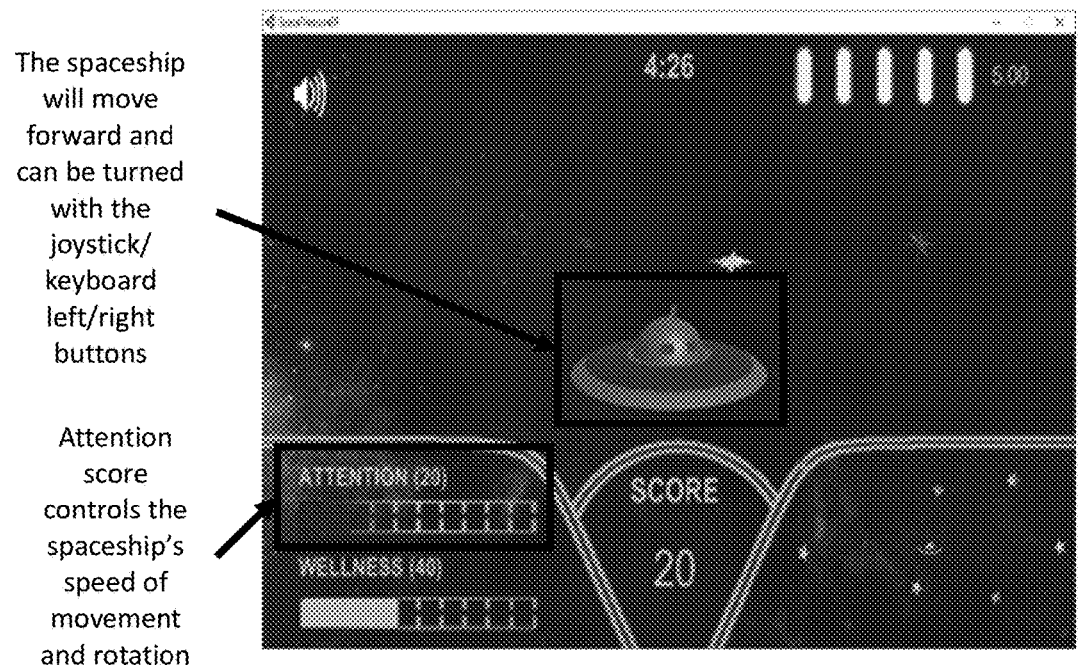
Figure 22:
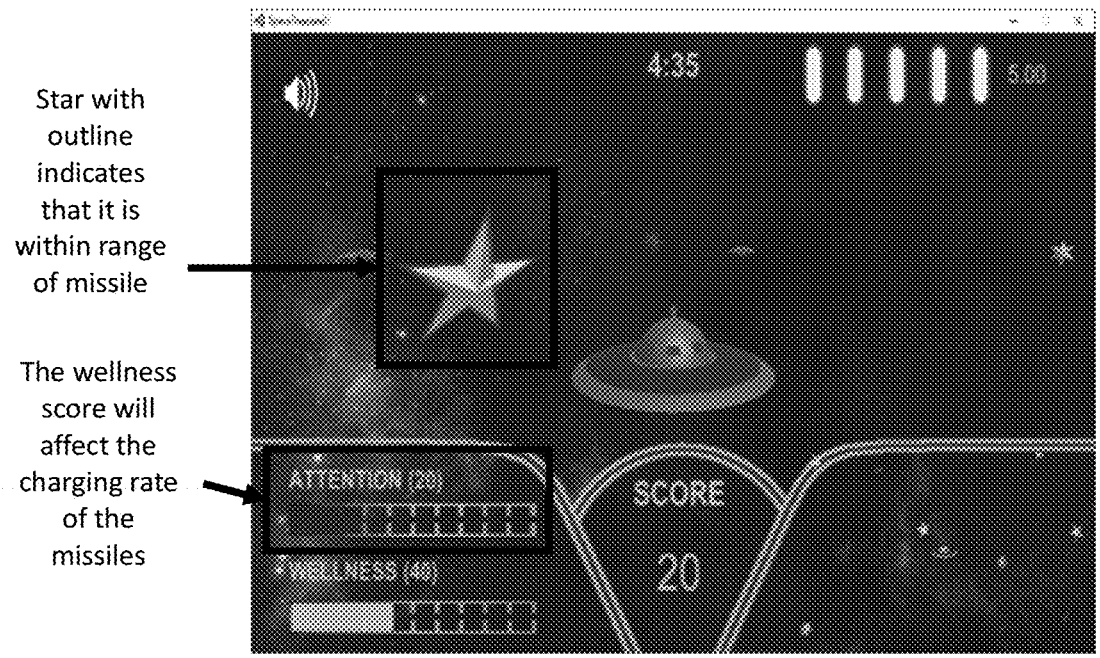
Figure 23:
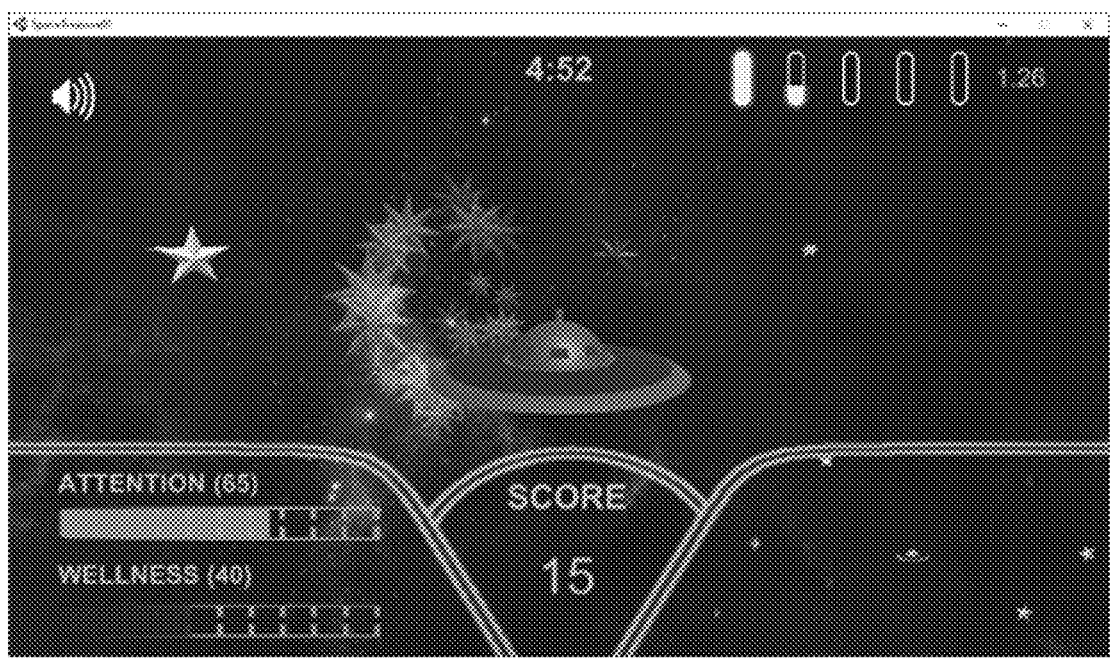
Figure 24:
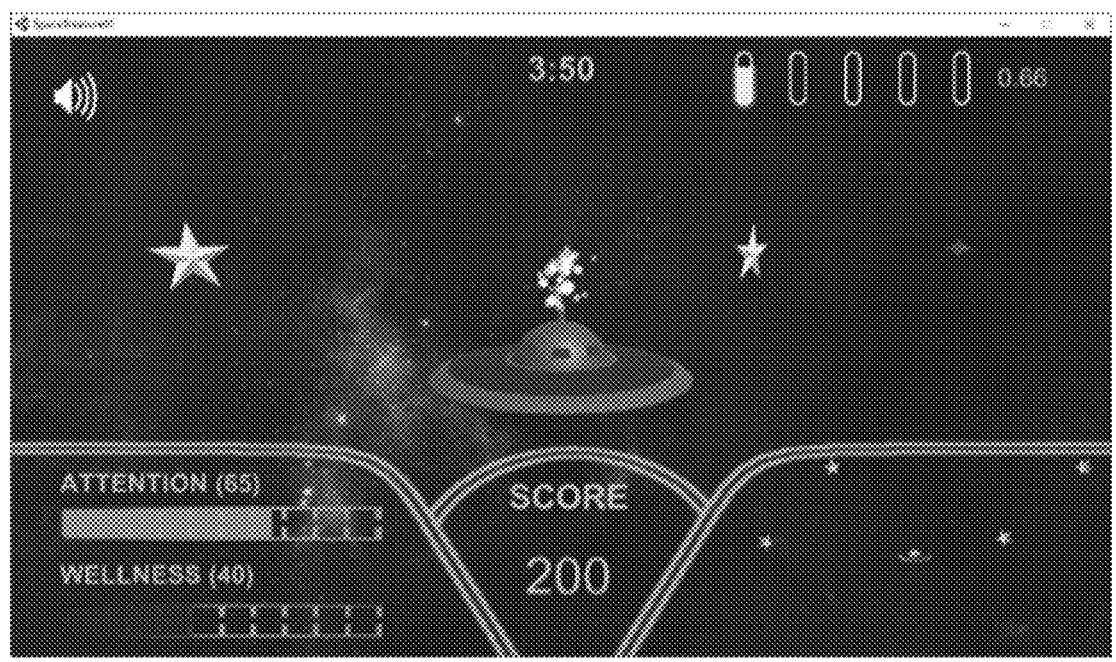

The system shown in FIG. 11, is in an in-use condition in FIG. 16. The display of the computer 1102 shows a sequence of questions to assess the pain level of the subject, as shown in FIGS. 17 and 18. FIG. 19 shows the user interface with the attention and wellness or pain level assessment scores shown, along with an interactive activity with which the user interacts via an input device—e.g. joystick. FIG. 20 shows further features of the display, including the sound adjustment menu, the remainder of the period until expiry of the session or game, missile charge (or other parameter as required by the game), the current score of the subject playing the game and a top-down view of the environment in which the subject is playing. FIGS. 21 to 24 provide example controls that are effected by user attention and pain level assessment or wellness scores.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A computer process for identifying and extracting pain-related electroencephalogram (EEG) signals, comprising:
   receiving, from a plurality of trials, EEG data for each trial, the EEG data comprising one or more signals each associated with a respective coordinate vector, the EEG data being labelled as being indicative of a pain state or a non-pain state;
   computing a first current density for each of the one or more signals, in the respective coordinate vector;
   estimating a second current density for a set of neural activity regions of interest, based on the computed first current density;
   computing at least one spectrum characteristic for each trial based on the estimated second current density;
   computing, based on the at least one spectrum characteristic, a mean and a variance of changes in the EEG data between the EEG data labelled as being indicative of the pain state and the EEG data labelled as being indicative of the non-pain state, for each neural activity region of interest; and
   identifying pain-related EEG signals based on at least one said neural activity region of interest at which the respective variance is below a predetermined threshold.

2. The computer process according to claim 1, wherein each of the first current density and the second current density is a radial current density.

3. The computer process according to claim 1, wherein computing the mean and the variance of changes in the EEG data involves computing at least one of a between-class scatter matrix and a total scatter matrix, based on the at least one spectrum characteristic, to determine a co-variance between at least two pain-related EEG classes.

4. The computer process according to claim 1, wherein computing the mean and the variance of changes in the EEG data comprises computing at least one of a between-class scatter matrix and a total scatter matrix.

5. The computer process according to claim 4, wherein both the between-class scatter matrix and the total scatter matrix are computed, and wherein identifying pain-related EEG signals based on at least one neural activity region of interest comprises satisfying an equation:

$$\text{argmin}_L f(L)$$

where f(L) is a multi-variate Fisher score for the neural activity region of interest L, where f(L) is:

$$f(L) = \text{trace } \{S_b(S_t + \gamma_I)^{-1}\}$$

where $S_b$ is the between-class scatter matrix, $S_t$ is the total scatter matrix, γ is a positive regularisation parameter, and I is an identity matrix.

6. The computer process according to claim 1, wherein the neural activity regions of interest are cortex locations of a subject.

7. The computer process according to claim 1, wherein the neural activity regions of interest are defined by EEG coordinates on a scalp of a subject.

8. The computer process according to claim 3, wherein the at least two pain-related EEG classes are a pain EEG class and a pain-free EEG class.

9. The computer process according to claim 1, further comprising:

building a binary classification machine for receiving current density or current density activity from further EEG data and outputting a scalar indicator;
receiving the further EEG data;
applying the binary classification machine to the further EEG data; and
classifying the further EEG data as being indicative of the pain state or the non-pain state based on the scalar indicator associated with the further EEG data.

10. The computer process according to claim 1, comprising:
collecting the EEG data from the plurality of trials, the plurality of trials comprising:
at least one trial performed by a first subject susceptible to experience pain; and
at least one trial performed by a second, healthy subject,
wherein the EEG data for each trial comprises the one or more signals;
setting an initial coordinate vector for each signal;
building a binary classification machine to discriminate between the at least two pain-related EEG states, based on EEG measurements from the at least one neural activity region of interest;
receiving further EEG data;
applying the binary classification machine to the further EEG data; and
receiving a scalar indicator from the binary classification machine and classifying, based on the scalar indicator, the further EEG data as being representative of either a pain EEG class or a pain-free EEG class.

11. The computer process according to claim 10, wherein the binary classification machine is at least one of:
a support vector machine;
a multi-layer neural network; and
a generalised linear discriminant analyser.

12. The computer process according to claim 10, wherein computing the mean and the variance comprises computing at least one of a between-class scatter matrix and a total scatter matrix, based on the at least one spectrum characteristic, to determine a co-variance between the pain EEG class and the pain-free EEG class.

13. The computer process according to claim 12, wherein computing the between-class scatter matrix and the total scatter matrix comprises:
generating spline interpolation matrices for at least two electrical properties of the EEG data;
transforming the EEG data into a current density estimate using the spline interpolation matrices;
computing band-powers for the current density estimate; and
calculating the between-class scatter matrix and the total scatter matrix using band-powers for the current density estimate.

14. The computer process according to claim 13, wherein computing the band-powers for the current density estimate comprises:
determining a current density time series for the current density estimate;
computing a vector of the band-powers for the current density time series using at least one of Fourier-based decomposition and band-pass filtering followed by energy computation.

15. The computer process according to claim 13, wherein classifying the further EEG sample using the binary classification machine comprises:
transforming the further EEG data into a further current density estimate using the spline interpolation matrices;
computing band-powers for the further current density estimate; and
applying the binary classification machine to the band-powers, wherein a positive output of the binary classification machine is indicative of a first state of the pain EEG state and the pain-free EEG state of a source of the further EEG data, and wherein a negative output of the binary classification machine is indicative of a second state of a pain EEG state and a pain-free EEG state of the source that is different from the first state.

16. The computer process according to claim 10, further comprising receiving an initial input comprising a numerical pain level assessment, and wherein receiving the further EEG data comprises receiving successive EEG epochs from continuously recorded EEG data, the computer process further comprising incrementing or decrementing the numerical pain level assessment based on whether each successive EEG epoch is classified as being representative of the pain EEG class or the pain-free EEG class.

17. A system for identifying and extracting pain-related EEG signals in accordance with the computer process of claim 1, comprising:
an EEG signal source;
memory; and
at least one processor, the memory storing instructions that, when executed by the at least one processor, cause the at least one processor to perform the computer process according to claim 1.

18. The system according to claim 17, wherein the EEG signal source is arranged to collect the EEG data from the plurality of trials, the plurality of trials comprising:
at least one trial of the plurality of trials performed by a first subject susceptible to experience pain; and
at least one trial of the plurality of trials performed by a second, healthy subject,
wherein the EEG data for each of the plurality of trials comprises the one or more signals;
wherein the at least one processor is configured to:
apply an initial coordinate vector for each said signal;
build a binary classification machine to discriminate between the at least two pain-related EEG states, based on EEG measurements from the at least one region of interest for extracting pain-related EEG signals;
receive further EEG data; and
classify the further EEG data using the binary classification machine to output a scalar indicator, and determining, from the scalar indicator, if the further EEG data is representative of a a pain EEG class or a pain-free EEG class.

19. The system according to claim 18, further comprising an input device for receiving an initial input comprising a numerical pain level assessment, and wherein the at least one processor is configured to:
receive the further EEG data by receiving successive EEG epochs from continuously recorded EEG data; and
increment or decrement the numerical pain level assessment based on whether each successive EEG epoch is classified as being representative of the pain EEG class or the pain-free EEG class.

20. The system according to claim 19, further comprising:
a display;
the input device; and one or more EEG devices for each region of the at least one region of interest, for recording the continuously recorded EEG data from which the successive EEG epochs are received, wherein the at least one processor is further configured to:

determine an attention score for a first EEG epoch from the successive EEG epochs;

display, on the display:
- the numerical pain level assessment;
- the attention score; and
- an interactive activity;

continually update the numerical pain level assessment and the attention score, during interaction with the interactive activity via the input device, based on subsequent EEG epochs from the successive EEG epochs; and adapt a behaviour of the interactive activity to reduce a number of subsequent EEG epochs that are classified as the pain EEG class.

* * * * *